(12) United States Patent
Asai et al.

(10) Patent No.: US 7,673,718 B2
(45) Date of Patent: Mar. 9, 2010

(54) LEG-WHEELED-TRAVELING MECHANISM

(75) Inventors: Katsuhiko Asai, Nara (JP); Atsushi Ono, Kyoto (JP)

(73) Assignee: Panasonic Corporation, Osaka (JP)

( * ) Notice: Subject to any disclaimer, the term of this patent is extended or adjusted under 35 U.S.C. 154(b) by 26 days.

(21) Appl. No.: 12/281,682

(22) PCT Filed: Feb. 20, 2008

(86) PCT No.: PCT/JP2008/000282

§ 371 (c)(1),
(2), (4) Date: Sep. 4, 2008

(87) PCT Pub. No.: WO2008/152759

PCT Pub. Date: Dec. 18, 2008

(65) Prior Publication Data

US 2009/0289433 A1  Nov. 26, 2009

(30) Foreign Application Priority Data

Jun. 11, 2007  (JP) ............................. 2007-153866

(51) Int. Cl.
*A61H 3/04* (2006.01)
(52) U.S. Cl. .................. 180/208; 180/8.3; 180/326
(58) Field of Classification Search ................ 180/208, 180/8.3, 209, 8.4, 326
See application file for complete search history.

(56) References Cited

U.S. PATENT DOCUMENTS 6,006,849 A * 12/1999 Watkins ....................... 180/209
6,364,040 B1 * 4/2002 Klann ......................... 180/8.1

FOREIGN PATENT DOCUMENTS

| JP | 5-329186 | 12/1993 |
| JP | 7-313565 | 12/1995 |
| JP | 11-128278 | 5/1999 |
| JP | 2006-055972 | 3/2006 |

OTHER PUBLICATIONS

Y. Sugahara et al., "Development of Bipedal Locomotor with Parallel Mechanism—7th Report: Walking Up and Down Stairs, Carrying a Human—", Preprints 1G24 for the 23rd Annual Conference of the Robotics Society of Japan, Sep. 15-17, 2005 (includes English Abstract and figure labels).

* cited by examiner

*Primary Examiner*—Lesley Morris
*Assistant Examiner*—Jacob Knutson
(74) *Attorney, Agent, or Firm*—Wenderoth, Lind & Ponack, LLP.

(57) ABSTRACT

A leg-wheeled traveling mechanism is provided with a seat portion, two follow-up legs, each having an end portion that is freely rotatably connected to the seat portion, with a distance between the end portion and a tip portion having a foot-rest portion being retractable, two or more support legs, each having an end portion that is freely rotatably connected to the seat portion, with a distance between the end portion and a tip portion having a wheel portion being retractable, a foot-position measuring unit that measures relative positional changes of the foot-rest portions and foot portions of a rider, and a control device that controls operations of the follow-up legs and the support legs, based upon the relative positional changes measured by the foot-position measuring unit so as to allow the foot-rest portions to move virtually in the same directions as those of the foot portions.

16 Claims, 18 Drawing Sheets

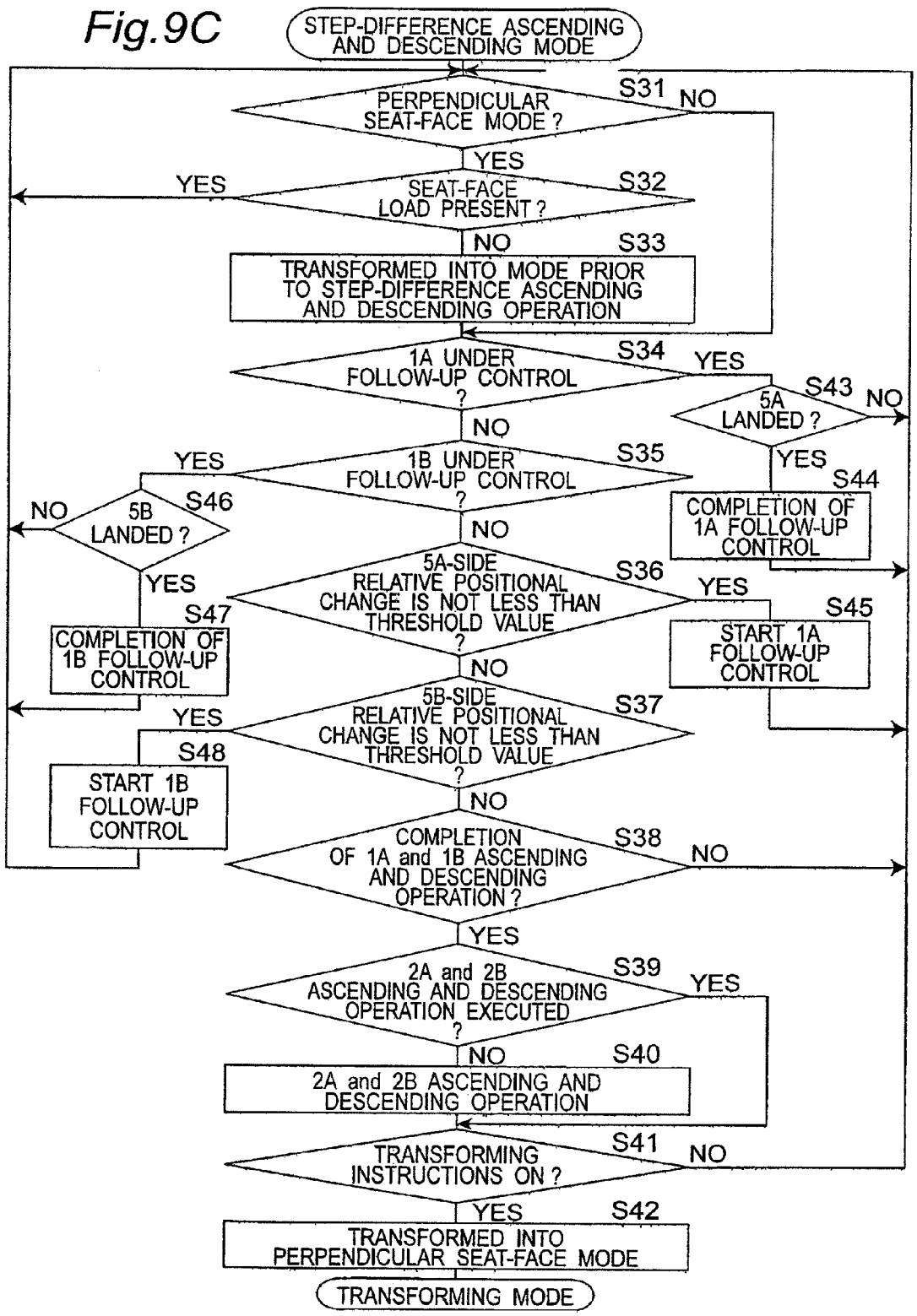

LEG-WHEELED-TRAVELING MECHANISM

TECHNICAL FIELD

The present invention relates to a leg-wheeled traveling mechanism that can travel, while crossing over a step difference in a short period of time in cooperation with a rider.

BACKGROUND ART

Along with an increase in the population of old people, there have been increasing demands for a small-size traveling mechanism for personal use, and its typical example includes a small-size traveling mechanism with wheels, such as an electric motor cart and an electric motor chair. However, within a range where such a small-size traveling mechanism is allowed to run, various step differences exist, thereby forming obstacles against its movements. In a case of a normal wheel-type small-size traveling mechanism, since the positions of the wheels relative to a seat are set to be virtually constant, the height of a step difference that the mechanism can cross over is dependent on a wheel base that corresponds to the wheel diameter and the gap between the front wheel and the rear wheel, and it becomes difficult to cross over such a step difference exceeding 10 cm.

Here, as the small-size traveling mechanism that is suitable for this step difference, a leg-type small traveling mechanism has been proposed (for example, see Non-Patent Document 1). By adopting a leg-type structure, it becomes possible to be applied to a big step difference with which the wheel-type small-size traveling mechanism fails to deal.

However, since the leg-type small-size traveling mechanism is inferior to the wheel-type small-size traveling mechanism in its mobility on plane places other than a step difference, a leg-wheeled small-size traveling mechanism, made by combining the two mechanisms with each other, has been proposed (for example, see Patent Documents 1 and 2).

Patent Document 1: Japanese Unexamined Patent Publication No. 11-128278

Patent Document 2: Japanese Unexamined Patent Publication No. 2006-055972

Non-Patent Document 1: Preprints 1G24 for the 23rd Annual Conference of the Robotics Society of Japan

DISCLOSURE OF INVENTION

Subject to be Solved by the Invention

Although the leg-wheeled small-size traveling mechanism makes it possible to provide both of features closer to the features of the wheel type upon traveling a plane place and features closer to the leg type upon ascending and descending a step difference; however, upon operating legs, that is, upon ascending and descending a step difference, it tends to have the same issues as those of the leg type mechanism. One of the issues of the leg-type small-size traveling mechanism is that the position of a rider becomes higher, making it highly possible to have a risk of falling down. Since it is necessary to ensure a sufficient leg-operational area so as to operate a leg-type small-size traveling mechanism, and since the rider needs to sit on a position that does not intervene with the operational area, the rider has to sit on a high position on the leg mechanism. For this reason, in the event of a falling down of the leg-type small-size traveling mechanism, the rider is brought into a dangerous circumstance, that is, a fall down from a high place. Still another issue is that it takes a long time to carry out step ascending and descending operations. In order to carry out the step ascending and descending operations, it is necessary to land a leg of the traveling mechanism at an appropriate position that ensures safety, after having recognized the state of a step difference, and in a case where the rider operates the leg-type traveling mechanism, the recognition of the step difference can be quickly executed by the rider; however, since the operations are difficult, it takes a long time. In contrast, in a case where the traveling mechanism automatically carries out the step ascending and descending operations, it takes a long time because the recognition of the state of the step difference becomes difficult. Consequently, the conventional leg-wheeled small-size traveling mechanism has an issue in that it is difficult to achieve both of the safety and the quick step-difference ascending and descending operations.

Therefore, in order to solve the above-mentioned issues, the object of the present invention is to provide a leg-wheeled traveling mechanism that can carry out step-difference ascending and descending operations quickly, while ensuring the safety of the rider.

Means for Solving the Subject

In order to achieve the above-mentioned object, the present invention has a structure as described below.

According to a first aspect of the present invention, there is provided a leg-wheeled traveling mechanism comprising:

a seat portion;

two follow-up legs, each having a follow-up leg end portion that is freely rotatably connected to the seat portion, and having a first wheel portion and a foot-rest portion at a follow-up leg tip portion, with a distance between the follow-up leg end portion and the follow-up leg tip portion being retractable;

two or more support legs, each having a support-leg end portion that is freely rotatably connected to the seat portion, and having a second wheel portion at a support-leg tip portion, with a distance between the support-leg end portion and a support-leg tip portion being retractable; and a control device for controlling operations of the follow-up legs and the support legs, wherein the leg-wheeled traveling mechanism further comprises a foot-position measuring unit for measuring relative, positional changes of the two foot-rest portions and foot portions of a rider so that the control device operates the follow-up legs based upon the relative positional changes measured by the foot-position measuring unit so as to allow the foot-rest portions to move virtually in the same directions as those of the foot portions of the rider.

Effects of the Invention

In accordance with the present invention, it becomes possible to obtain the leg-wheeled traveling mechanism (for example, leg-wheel traveling vehicle) that can carry out step-difference ascending and descending operations quickly, while ensuring the safety of the rider. That is, in accordance with the present invention, by using information about relative positional changes between the foot portions of the rider and the foot-rest portions, the foot-rest portions, attached to the tips of the follow-up legs, are allowed to follow up the foot portions of the rider so that, in cooperation with the movements of the foot portions of the rider himself or herself that have been determined by the rider based upon his or her recognition on the state of a step difference, the legs of the leg-wheeled traveling mechanism (for example, leg-wheel traveling vehicle) are operated; therefore, it is possible to quickly carry out the recognition of the step difference state and the operations of the legs of the leg-wheeled traveling mechanism (for example, leg-wheel traveling vehicle). Therefore, it becomes possible to obtain the leg-wheeled traveling mechanism (for example, leg-wheel traveling vehicle) that can carry out step-difference ascending and descending operations quickly, while ensuring the safety of the rider.

BRIEF DESCRIPTION OF DRAWINGS

These and other aspects and features of the present invention will become clear from the following description taken in conjunction with the preferred embodiments thereof with reference to the accompanying drawings, in which:

FIG. 9C is a flow chart that shows a step-difference ascending and descending mode of the leg-wheel traveling vehicle.

BEST MODE FOR CARRYING OUT THE INVENTION

Figure 1A:
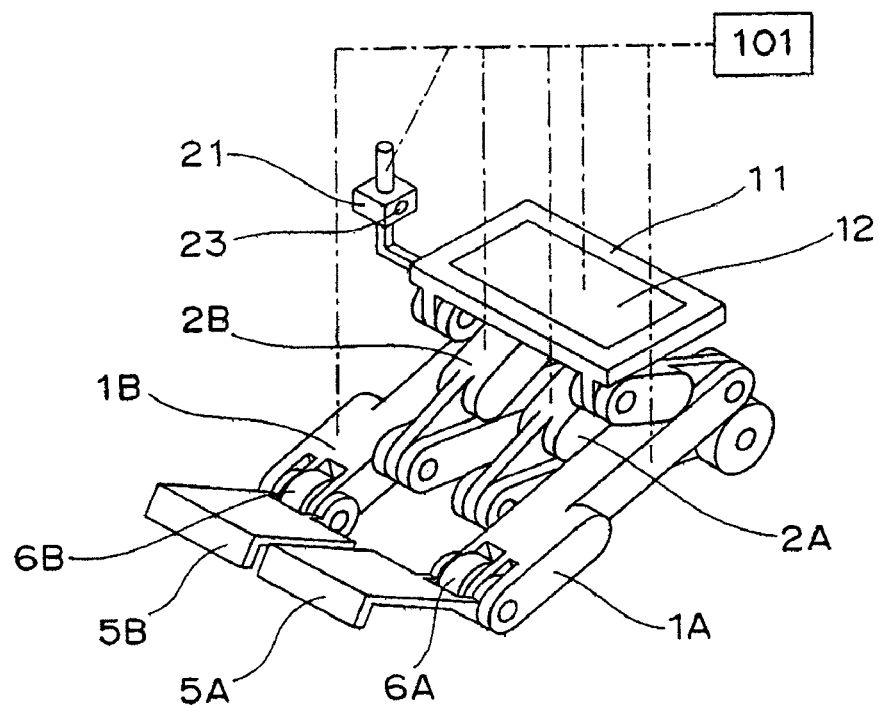
FIG. 1A is a perspective view that shows a schematic structure of a leg-wheel traveling vehicle in accordance with a first embodiment of the present invention.

Referring to the drawings, the following description will discuss embodiments of the present invention in detail.

Prior to describing the embodiments of the present invention in detail with reference to the drawings, the following description will discuss various modes of the present invention.

According to a first aspect of the present invention, there is provided a leg-wheeled traveling mechanism comprising:

a seat portion (seat face portion);

two follow-up legs, each having a follow-up leg end portion that is freely rotatably connected to the seat portion, and having a first wheel portion and a foot-rest portion at a follow-up leg tip portion, with a distance between the follow-up leg end portion and the follow-up leg tip portion being retractable;

two or more support legs, each having a support-leg end portion that is freely rotatably connected to the seat portion, and having a second wheel portion at a support-leg tip portion, with a distance between the support-leg end portion and a support-leg tip portion being retractable; and a control device for controlling operations of the follow-up legs and the support legs, wherein the leg-wheeled traveling mechanism further comprises a foot-position measuring unit for measuring relative positional changes of the two foot-rest portions and foot portions of a rider so that the control device operates the follow-up legs based upon the relative positional changes measured by the foot-position measuring unit so as to allow the foot-rest portions to move virtually in the same directions as those of the foot portions of the rider.

In accordance with this arrangement, by using information about relative positional changes between the foot portions of the rider and the foot-rest portions, the foot-rest portions, attached to the tips of the follow-up legs, are allowed to follow up the foot portions of the rider so that, in cooperation with the movements of the foot portions of the rider himself or herself that have been determined by the rider based upon his or her recognition on the state of a step difference, the legs of the leg-wheeled traveling mechanism (for example, leg-wheel traveling vehicle) are operated; therefore, it is possible to quickly carry out the recognition of the step difference state and the operations of the legs of the leg-wheeled traveling mechanism (for example, leg-wheel traveling vehicle). Therefore, it becomes possible to obtain a leg-wheeled traveling mechanism (for example, leg-wheel traveling vehicle) that can carry out step-difference ascending and descending operations quickly, while ensuring the safety of the rider. Therefore, it becomes possible to obtain a leg-wheeled traveling mechanism (for example, leg-wheel traveling vehicle) that can carry out step-difference ascending and descending operations quickly, while ensuring the safety of the rider.

According to a second aspect of the present invention, there is provided the leg-wheeled traveling mechanism according to the first aspect, wherein the foot-position measuring unit is formed by a relative-position measuring unit for measuring an amount of change and a direction of change of a flexibly expandable coupling mechanism that couples the foot portions of the rider to the foot-rest portions.

In accordance with this arrangement, since the foot portions of the rider and the foot-rest portions are coupled to each other, it becomes possible to easily measure relative positional changes between the foot portions of the rider and the foot-rest portions. Therefore, it becomes possible to obtain a leg-wheeled traveling mechanism (for example, leg-wheel traveling vehicle) in which the legs are more positively operated in cooperation with the movements of the foot portions of the rider.

According to a third aspect of the present invention, there is provided the leg-wheeled traveling mechanism according to the first aspect, wherein the foot-position measuring unit is a device for measuring the relative positional changes in a non-contact state by using sound waves or light waves.

In accordance with this arrangement, since the relative positional changes between the foot portions of the rider and the foot-rest portions can be measured in a non-contact state, the rider is allowed to move his or her feet freely. Therefore, it is possible to obtain a leg-wheeled traveling mechanism (for example, leg-wheel traveling vehicle) that can reduce the possibility of a risk such as falling down of the rider due to the restrictions onto the foot-rest portions.

According to a fourth aspect of the present invention, there is provided the leg-wheeled traveling mechanism according to any one of the first to third aspects, wherein the first wheel portions attached to the follow-up legs are driven wheels, while the second wheel portions attached to the support legs are driving wheels.

With this arrangement, since no driving source for rotating the wheel portion is required in the follow-up legs, the follow-up legs can be operated more quickly in cooperation with the movements of the foot portions of the rider, and it becomes possible to obtain a leg-wheeled traveling mechanism (for example, leg-wheel traveling vehicle) that can carry out step-difference ascending and descending operations more quickly.

According to a fifth aspect of the present invention, there is provided the leg-wheeled traveling mechanism according to any one of the first to fourth aspects, wherein the control device controls transformed states of the follow-up legs so that the relative positional changes between the foot-rest portions and the foot portions of the rider are set within a predetermined range.

With this arrangement, since the follow-up legs are operated in cooperation with the foot portions of the rider, with a predetermined distance kept therefrom, it becomes possible to obtain a leg-wheeled traveling mechanism (for example, leg-wheel traveling vehicle) which can carry out step-difference ascending and descending operations more positively.

According to a sixth aspect of the present invention, there is provided the leg-wheeled traveling mechanism according to any one of the first to fourth aspects, wherein the control device divides each of the relative positional changes between the foot-rest portions and the foot portions of the rider into a horizontal component and a vertical component so that a transformed state of the follow-up leg is controlled so as to maintain each of the components within a predetermined range.

With this arrangement, since the relative positional changes in vertical directions are more positively ensured, it becomes possible to further improve the safety of the leg-wheeled traveling mechanism.

According to a seventh aspect of the present invention, there is provided the leg-wheeled traveling mechanism according to the fifth or sixth aspect, further comprising:

a landing determination device for respectively determining landed states of the two foot-rest portions, wherein, from a time when the foot-rest portions have come into the landed state, the control device controls transformed states of the follow-up legs provided with the foot-rest portions independent of the relative positional changes measured by the foot-position measuring unit, and thereafter, from a time when each of the relative positional changes has reached a predetermined value or more, again controls transformed states of the follow-up legs so that the relative positional changes between the foot-rest portions and the foot portions of the rider are set within a predetermined range.

With this arrangement, since the follow-up leg with its foot-rest portion being landed is made free from unnecessary movements, it becomes possible to carry out step-difference ascending and descending operations more stably.

According to an eighth aspect of the present invention, there is provided the leg-wheeled traveling mechanism according to the seventh aspect, wherein the predetermined value is greater than a maximum value of the relative positional changes within the predetermined range.

With this arrangement, since the follow-up leg is made free from unnecessary movements at a stage where its foot-rest portion has been landed, it becomes possible to carry out step-difference ascending and descending operations more stably.

According to a ninth aspect of the present invention, there is provided the leg-wheeled traveling mechanism according to any one of the first to eighth aspects, further comprising:

a riding state determining device for detecting a riding state of the rider so that, in a case where under the riding state, the first wheel portion or the second wheel portion is rotating, the control device controls the transformed states of the follow-up legs and the support legs, independent of the relative positional changes measured by the foot-position measuring unit.

With this arrangement, it becomes possible to prevent a leg movement that is not intended by the rider from being executed due to a movement of the foot portion of the rider upon traveling on wheels, and consequently to provide a leg-wheeled traveling mechanism (for example, leg-wheel traveling vehicle) which can further ensure safety.

According to a tenth aspect of the present invention, there is provided the leg-wheeled traveling mechanism according to the ninth aspect, wherein the riding state determining device determines the riding state based upon a load applied to a seat face of the seat portion.

With this arrangement, it becomes possible to more easily determine the riding state of the rider.

According to an 11th aspect of the present invention, there is provided the leg-wheeled traveling mechanism according to any one of the first to tenth aspects, wherein the control device operates the follow-up legs and the support legs so that the seat portion is made virtually horizontal to a ground under the traveling state, and in a mid time from the traveling state to a shift to an operative state of the follow-up legs based upon relative positional changes measured by the foot-position measuring unit, the control device operates the follow-up legs and the support legs so that the seat portion is made virtually perpendicular to the ground.

With this arrangement, since the leg-wheeled traveling mechanism (for example, leg-wheel traveling vehicle) is allowed to assist the rider to attain a stand-up state prior to the step-difference ascending and descending operations, it is possible to more quickly proceed to the step-difference ascending and descending operations.

According to a 12th aspect of the present invention, there is provided the leg-wheeled traveling mechanism according to the 11th aspect, wherein, upon operating the follow-up legs and the support legs so as to shift a seat face of the seat portion from a state virtually in parallel with a ground to a virtually perpendicular state, the control device controls each of the foot-rest portions so that an angle of each of the foot-rest portions is always kept horizontal, or kept in such a manner that a tip side thereof is made higher.

With this arrangement, since the rider is allowed to naturally lean against the seat upon attaining the stand-up state, it is possible to proceed to the step-difference ascending and descending operations more safely.

According to a 13th aspect of the present invention, there is provided the leg-wheeled traveling mechanism according to any one of the first to 12th aspects, wherein, upon allowing each of the follow-up legs to leave from a ground, the control device controls transformed states of the support legs so that balance of the leg-wheeled traveling mechanism is properly maintained.

With this arrangement, even when the follow-up leg leaves from the ground to follow the foot portion of the rider, the support legs are transformed so as to maintain the balance, it is possible to provide a leg-wheeled traveling mechanism (for example, leg-wheel traveling vehicle) which can further ensure safety.

According to a 14th aspect of the present invention, there is provided the leg-wheeled traveling mechanism according to any one of the first to 13th aspects, wherein the control device controls the support legs by using operation history of the follow-up legs.

With this arrangement, since information of a step difference can be obtained from the operation history of the follow-up legs, it becomes possible to easily recognize the step difference condition when operating the support legs, and consequently to obtain a leg-wheeled traveling mechanism (for example, leg-wheel traveling vehicle) which can execute the step-difference ascending and descending operations more quickly.

Referring to the drawings, the following description will discuss embodiments of the present invention in detail.

First Embodiment

Figure 1B:
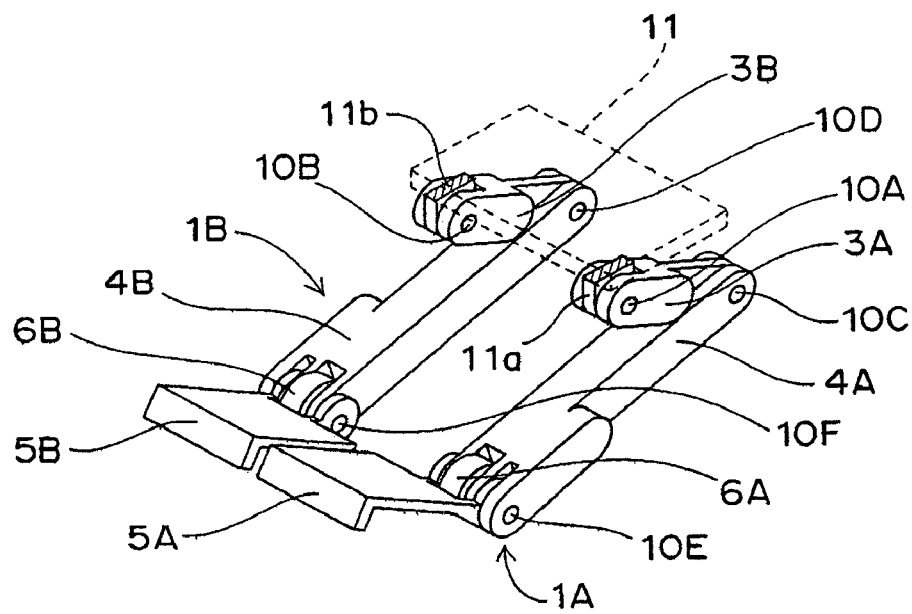
FIG. 1B is a perspective view that shows a schematic structure of a portion corresponding to follow-up legs of the leg-wheel traveling vehicle in accordance with the first embodiment of the present invention.
Figure 1C:
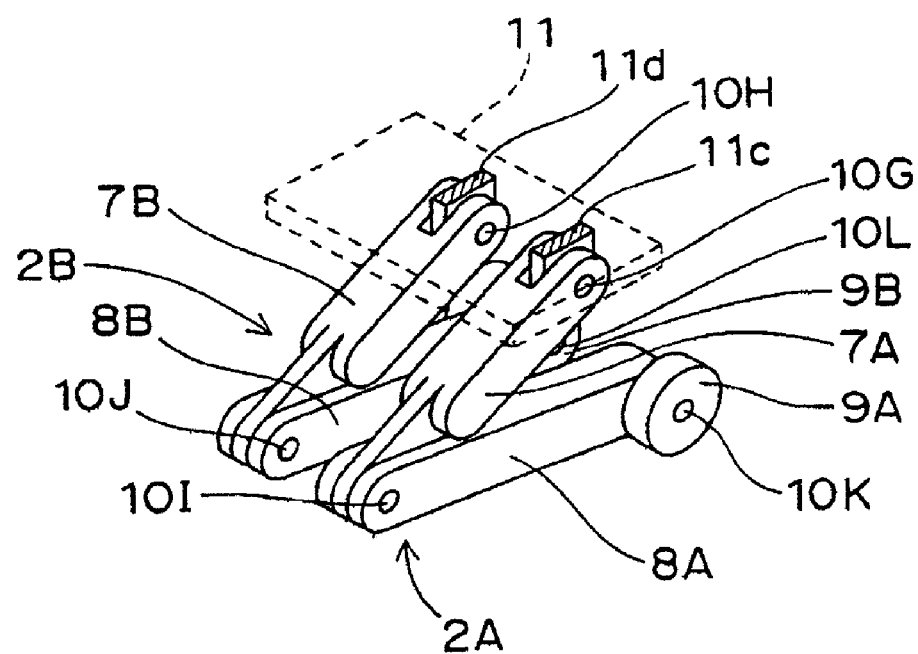
FIG. 1C is a perspective view that shows a schematic structure of a portion corresponding to support legs of the leg-wheel traveling vehicle in accordance with the first embodiment of the present invention.
Figure 2A:
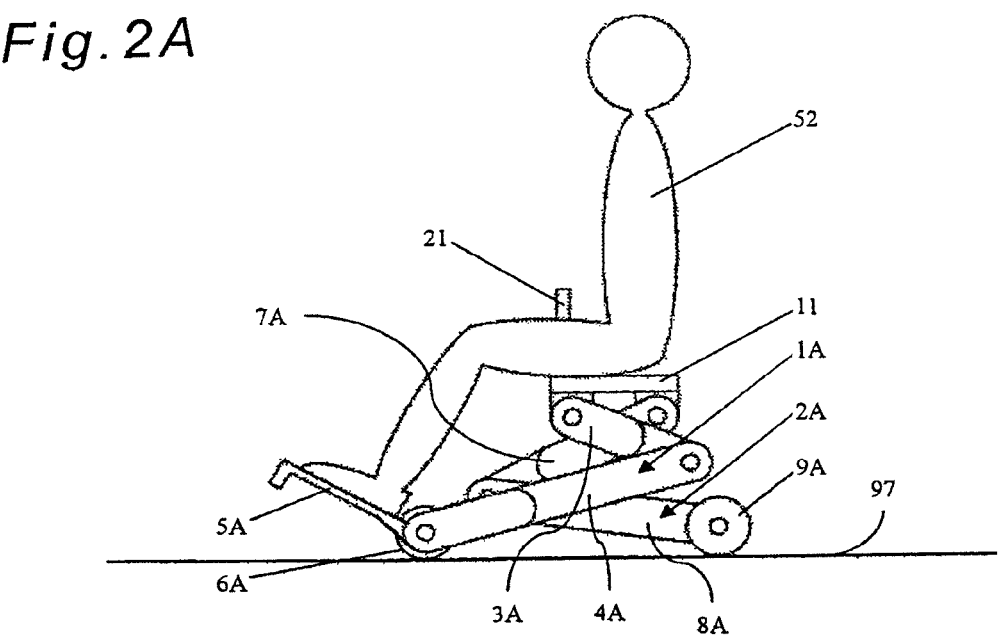
FIG. 2A is a side view that shows a schematic structure of the leg-wheel traveling vehicle in accordance with the first embodiment of the present invention.
Figure 2B:
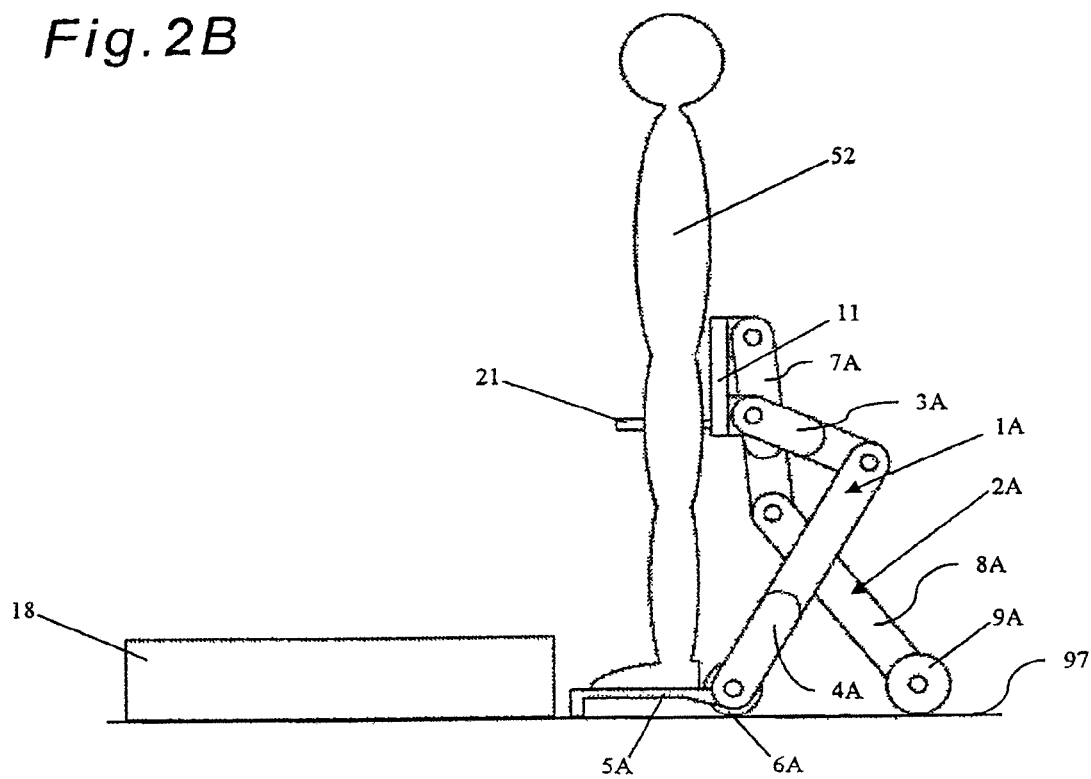
FIG. 2B is a side view that shows a schematic structure of the leg-wheel traveling vehicle in accordance with the first embodiment of the present invention.

FIG. 1A is a perspective view that shows a schematic structure of a leg-wheel traveling vehicle as one example of a leg-wheeled moving mechanism in accordance with a first embodiment of the present invention, and FIG. 1B and FIG. 1C are perspective views that respectively show only portions corresponding to follow-up legs and support legs in the same drawing as FIG. 1A. Moreover, FIGS. 2A and 2B are side views that respectively show a state in which a rider 52 is sitting on the leg-wheel traveling vehicle in FIG. 1A and a state in which the rider 52 is standing thereon. In FIGS. 1A, 1B, and 1C, reference numerals 1A and 1B respectively represent two link legs that are one example of follow-up legs, and reference numerals 2A and 2B respectively represent two link legs that are one example of support legs. The two link legs 1A and 1B are respectively configured by front leg upper links 3A and 3B, front leg lower links 4A and 4B that are longer than the front leg upper links 3A and 3B, plate-shaped foot rest portions 5A and 5B, and universal wheels 6A and 6B that are one example of driven wheels that serve one example of wheel units on the follow-up leg side. Moreover, the two link legs 2A and 2B are respectively configured by rear leg upper links upper links 7A and 7B, rear leg lower links 8A and 8B that are longer than the rear leg upper links 7A and 7B, and rubber tires 9A and 9B that are one example of driving wheels that serve one example of wheel units on the support leg side.

As shown in FIG. 1B, the front leg upper link 3A has its tip (tip facing diagonally upward on the front side in FIG. 1B) branched into two portions so that a front side support portion 11a that is extended downward from the rear face of a plate-shaped seat portion 11 is rotatably sandwiched between the two portions, and an end portion of a base end (base end facing diagonally downward on the rear side in FIG. 1B) is coupled to an end portion of one end (one end facing diagonally upward on the rear side) of the front leg lower link 4A, so as to be allowed to rotate centered on a rotation shaft 10C; thus, a joint driving motor 62 having a built-in encoder, installed in the front leg lower link 4A is drive-controlled by a controlling computer 101 serving as one example of a control device so that the rotation angle of the rotation shaft 10C coupled to a forward-reverse rotation shaft of the joint driving motor 62 is controlled based upon information given from the built-in encoder.

In the same manner, the front leg upper link 3B has its tip (tip facing diagonally upward on the front side in FIG. 1B) branched into two portions so that a front side support portion 11b that is extended downward from the rear face of the seat portion 11 is rotatably sandwiched between the two portions, and an end portion of a base end (base end facing diagonally downward on the rear side in FIG. 1B) is coupled to an end portion of one end (one end facing diagonally upward on the rear side in FIG. 1B) of the front leg lower link 4B, so as to be allowed to rotate centered on a rotation shaft 10D; thus, a joint driving motor 64 having a built-in encoder, installed in the front leg lower link 4B is drive-controlled by the controlling computer 101 serving as one example of the control device so that the rotation angle of the rotation shaft 10D coupled to a forward-reverse rotation shaft of the joint driving motor 64 is controlled.

Moreover, as shown in FIG. 1C, the rear leg upper link 7A has its tip (tip facing diagonally upward on the rear side in FIG. 1C) branched into two portions so that a rear side support portion 11c that is extended downward from the rear face of the seat portion 11 is rotatably sandwiched between the two portions, and an end portion of a base end (base end facing diagonally downward on the front side in FIG. 1C) is coupled to an end portion of one end (front end in the back-and-forth direction in FIG. 1C) of the rear leg lower link 8A, so as to be allowed to rotate centered on a rotation shaft 10I; thus, a joint driving motor 66 having a built-in encoder, installed in the rear leg lower link 8A is drive-controlled by the controlling computer 101 so that the rotation angle of the rotation shaft 10I coupled to a forward-reverse rotation shaft of the joint driving motor 66 is controlled. In the same manner, the rear leg upper link 7B has its tip (tip facing diagonally upward on the rear side in FIG. 1C) branched into two portions so that a rear side support portion 11d that is extended downward from the rear face of the seat portion 11 is rotatably sandwiched between the two portions, and an end portion of a base end (base end facing diagonally downward on the front side in FIG. 1C) is coupled to an end portion of one end (front end in the back-and-forth direction in FIG. 1C) of the rear leg lower link 8B, so as to be allowed to rotate centered on a rotation shaft 10J; thus, a joint driving motor 68 having a built-in encoder, installed in the rear leg lower link 8B is drive-controlled by the controlling computer 101 so that the rotation angle of the rotation shaft 10J coupled to a forward-reverse rotation shaft of the joint driving motor 68 is controlled.

Moreover, rubber tires 9A and 9B are respectively attached to end portions of the other ends (rear end in the lateral direction in FIG. 1C) of the rear leg lower links 8A and 8B so as to be allowed to rotate centered on respective rotation shafts 10K and 10L; thus, traveling motors 81 and 82, installed in the rear leg lower links 8A and 8B, are respectively drive-controlled by the controlling computer 101 so that the rotation speeds of the rotation shafts 10K and 10L coupled to forward-reverse rotation shafts of the joint-driving motors 81 and 82 are respectively controlled independently.

Moreover, each end portion of the other ends (the other ends facing diagonally downward on the front side in FIG. 1B) of the front leg lower links 4A and 4B is branched into three portions, and each of universal wheels 6A and 6B is attached to the two inside branched portions of the three branched portions so as to be allowed to freely rotate on each of the rotation shafts 10E and 10F centered on each of the rotation shafts 10E and 10F so that these wheels form all directional wheels; thus, these wheels are allowed to move in response to rightward and leftward movements of the leg-wheel traveling vehicle by rollers attached onto the periphery of each of the wheels 6A and 6B so that by making the numbers of revolutions of the right and left rubber tires 9A and 9B different from each other, turning operations of the leg-wheel traveling vehicle can be achieved.

Moreover, each end portion of the other ends (the other ends facing diagonally downward on the front side in FIG. 1B) of the front leg lower links 4A and 4B is branched into three portions, and each of foot rest portions 5A and 5B is attached to the two outside branched portions of the three branched portions so as to be allowed to rotate coaxially with the rotation shafts 10E and 10F, and rotating motors 71 and 72 having built-in foot-rest encoders, installed in the respective front leg lower links 4A and 4B, are respectively drive-controlled by the controlling computer 101 so that the rotation angles of the rotation shafts 10E and 10F coupled to forward-reverse rotation shafts of the foot-rest rotating motors 71 and 72 are respectively controlled independently.

As described earlier, the end portions of the two link legs 1A and 1B and the end portions of the two link legs 2A and 2B are respectively coupled to the support portions 11a, 11b, 11c, and 11d of the seat portion 11 so as to be allowed to rotate centered on the rotation shafts 10A, 10B, 10G, and 10H, and joint driving motors 61, 63, 65 and 67 having built-in encoders, respectively installed in the front-leg upper link 3A, the front-leg upper link 3B, the rear-leg upper link 7A, and the rear-leg upper link 7B, are respectively drive-controlled by the controlling computer 101 so that the rotation angles of the rotation shafts 10A, 10B, 10G, and 10H coupled to the forward-reverse rotation shafts of the joint-driving motors 61, 63, 65, and 67 are respectively controlled. Moreover, a load sensor 12, which detects a load applied onto the seat in the center of the seat portion 11, is attached to the seat portion 11 so that, by allowing the load sensor 12 to detect a value exceeding a predetermined value, the fact that a rider 52 is setting on the seat can be detected, and a console 21 is installed on a side portion of the seat portion 11 so that, by using the console 21, instructions from the rider 52 can be inputted to the controlling computer 101. The console 21 is configured by a joystick 22 used for carrying out controlling operations at the time of wheel-traveling and for giving instructions on transforming directions and a transformation instructing button 23 used for giving instructions on transformations of the two link legs 1A, 1B, 2A, and 2B of the leg-wheel traveling vehicle.

Figure 3A:
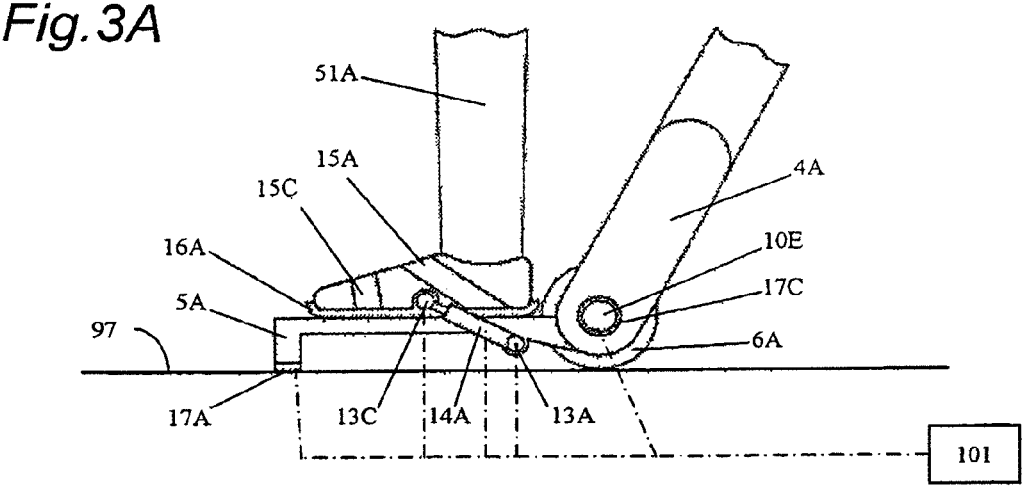
FIG. 3A is a side view that shows a detailed structure on the periphery of a foot rest portion 5A of the leg-wheel traveling vehicle.
Figure 3B:
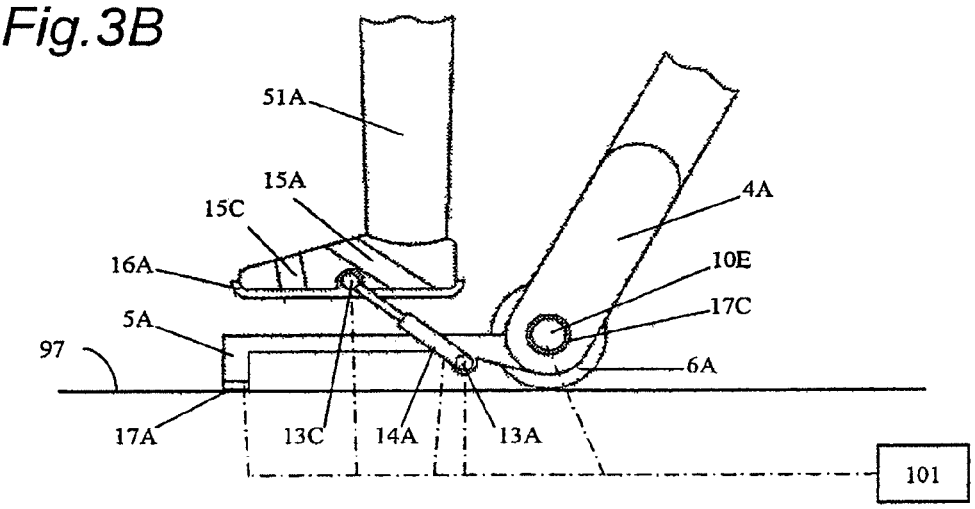
FIG. 3B is a side view that shows a detailed structure on the periphery of a foot rest portion 5A of the leg-wheel traveling vehicle.
Figure 3C:
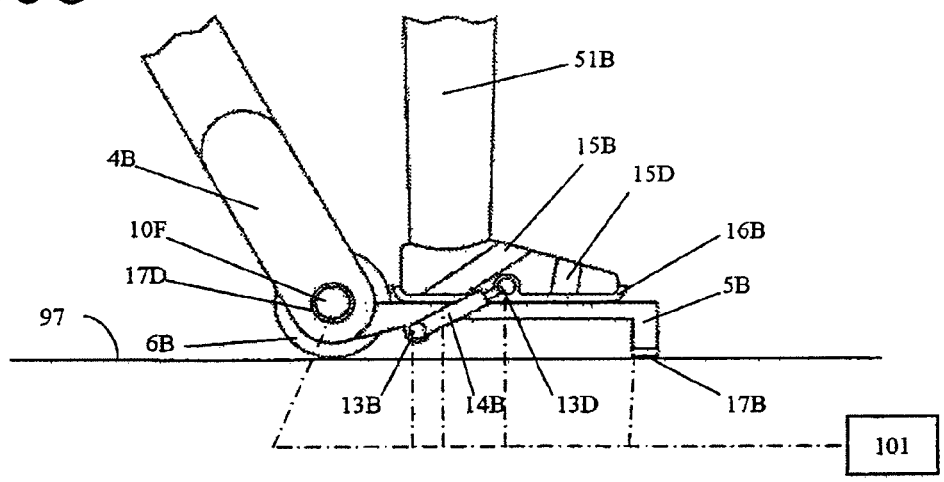
FIG. 3C is a side view that shows a detailed structure on the periphery of a foot rest portion 5B of the leg-wheel traveling vehicle.

FIGS. 3A and 3C are side views that indicate the periphery of the respective foot rest portion 5A and foot rest portion 5B in detail. Each of the foot rest portion 5A and the foot rest portion 5B is formed by a plate member having virtually an L-letter shape. A rotation shaft 13A, provided with a rotary encoder 91A that detects the rotation angle of the rotation shaft 13A, is placed on the lower portion of the side face of a portion in the center of the foot rest portion 5A slightly closer to the universal wheel 6A, so as to freely rotate thereon. One end (lower end in FIG. 3A) of a slide rod 14A that is allowed to be retractable, and serves as one example of a coupling mechanism that can be retractable, is coupled to the rotation shaft 13A so that the length of the slide rod 14A can be measured by the built-in linear encoder 93A. Moreover, a rotation shaft 13C, provided with a rotary encoder 92A that detects the rotation angle of the rotation shaft 13C, is coupled to the other end (the upper end in FIG. 3A) of the slide rod 14A. This rotation shaft 13C is coupled to a cover 16A that can be secured to a foot portion 51A of the rider 52 by using an instep-portion fixing band 15A and a toe-portion fixing band 15C, so as to freely rotate thereon. The cover 16A is designed to cover the entire rear face of the foot portion 51A of the rider 52. Thus, the above-mentioned rotary encoder 91A, linear encoder 93A, and rotary encoder 92A are allowed to form a relative position measuring unit serving as one example of a foot position measuring unit 90A so that the relative positional changes of the foot rest portion 5A and the foot portion 51A of the rider 52 can be respectively measured. In the same manner, a rotation shaft 13B, provided with a rotary encoder 91B that detects the rotation angle of the rotation shaft 13B, is placed on the lower portion of the side face of a portion in the center of the foot rest portion 5B slightly closer to the universal wheel 6A, so as to freely rotate thereon. One end (lower end in FIG. 3A) of a slide rod 14B that is allowed to be retractable is coupled to the rotation shaft 13B so that the length of the slide rod 14B can be measured by the built-in linear encoder 93B. Thus, by the rotary encode 91B and the linear encoder 93B that form one example of a foot-position measuring unit 90B, the position of the foot rest portion 5B can be measured. Moreover, a rotation shaft 13D, is provided with a rotary encoder 92B that detects the rotation angle of the rotation shaft 13D, is coupled to the other end (the upper end in FIG. 3A) of the slide rod 14B. This rotation shaft 13D is coupled to a cover 16B that can be secured to a foot portion 51B of the rider 52 by using an instep-portion fixing band 15B and a toe-portion fixing band 15D, so as to freely rotate thereon. The cover 16B is designed to cover the entire rear face of the foot portion 51B of the rider 52. Thus, the above-mentioned rotary encoder 91B, linear encoder 93B, and rotary encoder 92B are allowed to form one example of a foot position measuring unit 90B so that the relative positional changes of the foot rest portion 5B and the foot portion 51B of the rider 52 can be respectively measured.

When the foot portion 51A of the rider 52 is left from the foot rest portion 5A, the slide rod 14A is extended as shown in FIG. 3B, with the result that based upon the length change of the slide rod 14A and the respective angle changes of the rotation shafts 13A and 13C, the relative positions of the foot rest portion 5A and the foot portion 51A of the rider 52 can be found by the foot position measuring unit 90A. In the same manner, when the foot portion 51B of the rider 52 is left from the foot rest portion 5B, the slide rod 14A is extended in the same manner as in FIG. 3B, with the result that based upon the length change of the slide rod 14B and the respective angle changes of the rotation shafts 13B and 13D, the relative position of the foot rest portion 5B and the foot portion 51B of the rider 52 can be found by the foot-position measuring unit 90B.

Moreover, a landing sensor 17A, which detects a landing of the foot rest portion 5A on the ground 97 or the like based upon the contact load of the foot-rest portion 5A to the ground 97 or the like, is placed on the lower portion of the bent portion of the tip of the foot-rest portion 5A, and a landing sensor 17C, which detects a landing of the universal wheel 6A on the ground 97 or the like based upon the load to be applied to the rotary shaft 10E, is placed on the periphery of the rotation shaft 10E. In the same manner, a landing sensor 17B, which detects a landing of the foot-rest portion 5B on the ground 97 or the like based upon the contact load of the foot-rest portion 5B to the ground 97 or the like, is placed on the lower portion of the bent portion of the tip of the foot-rest portion 5B, and a landing sensor 17D, which detects a landing of the universal wheel 6B on the ground 97 or the like based upon the load to be applied to the rotary shaft 10F, is placed on the periphery of the rotation shaft 10F.

Figure 7:
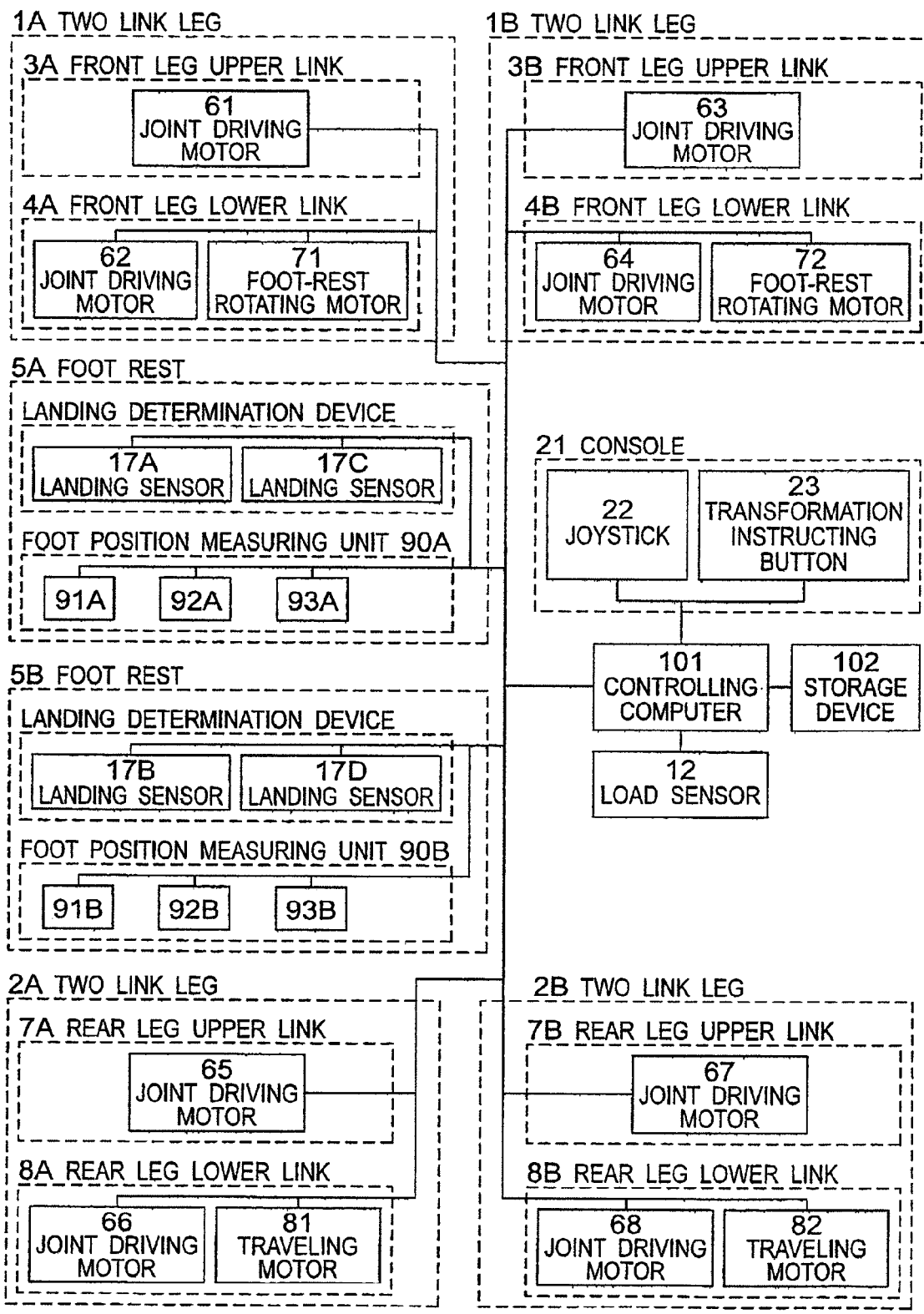
FIG. 7 is a view that shows connection relationships between a controlling computer and the respective portions of the leg-wheel traveling vehicle.

Here, FIG. 7 collectively shows the connection relationship between the respective portions including the landing sensors 17A, 17B, 17C, and 17D (devices functioning as one example of a landing determination device) and the controlling computer 101. Moreover, a storage device 102 is connected to the controlling computer 101, and in the storage device 102, history of the rotation angle of each of the rotation shafts serving as one example of operation history, and rotation angles of the respective rotation shafts 10A to 10D and 10G to 10J of desired modes, such as traveling mode, perpendicular seat-face mode, and mode prior to step-difference ascending and descending operation, as well as modes of the leg-wheel vehicle in the step-difference ascending and descending operations, are stored by the controlling computer 101 in a manner so as to be reusable.

Figure 4A:
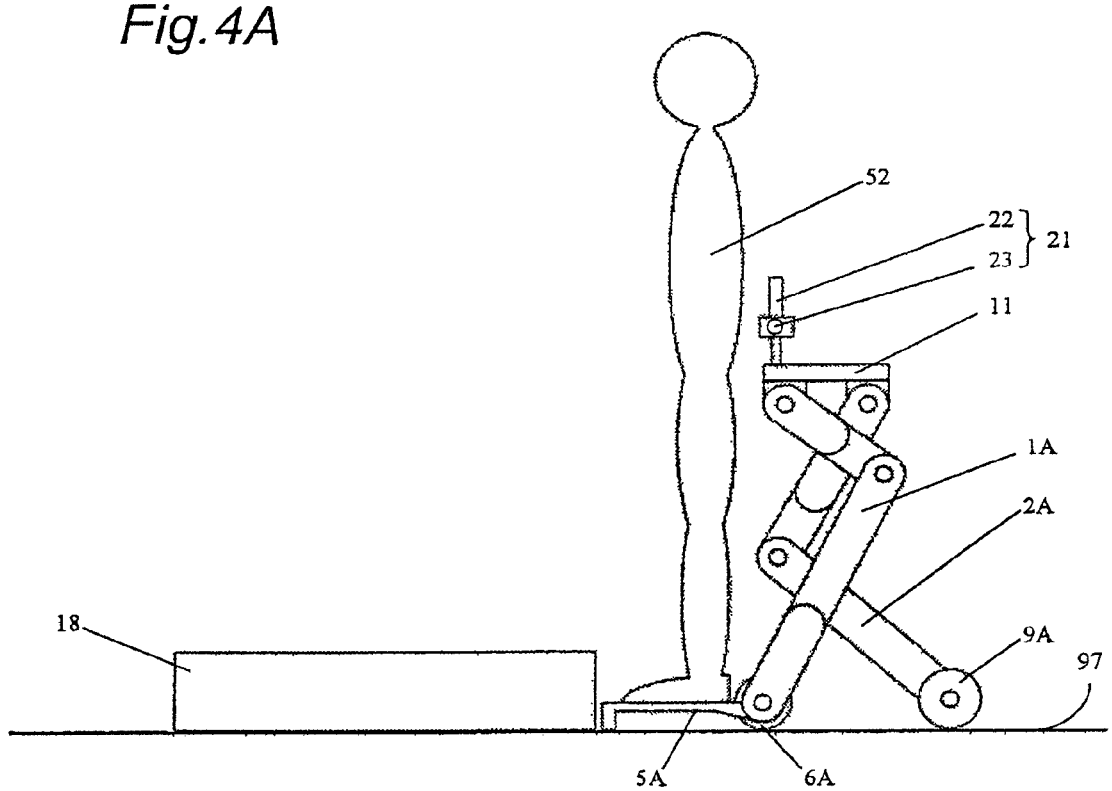
FIG. 4A is a side view that schematically shows step-difference ascending and descending operations of the leg-wheel traveling vehicle in accordance with the first embodiment of the present invention.
Figure 4B:
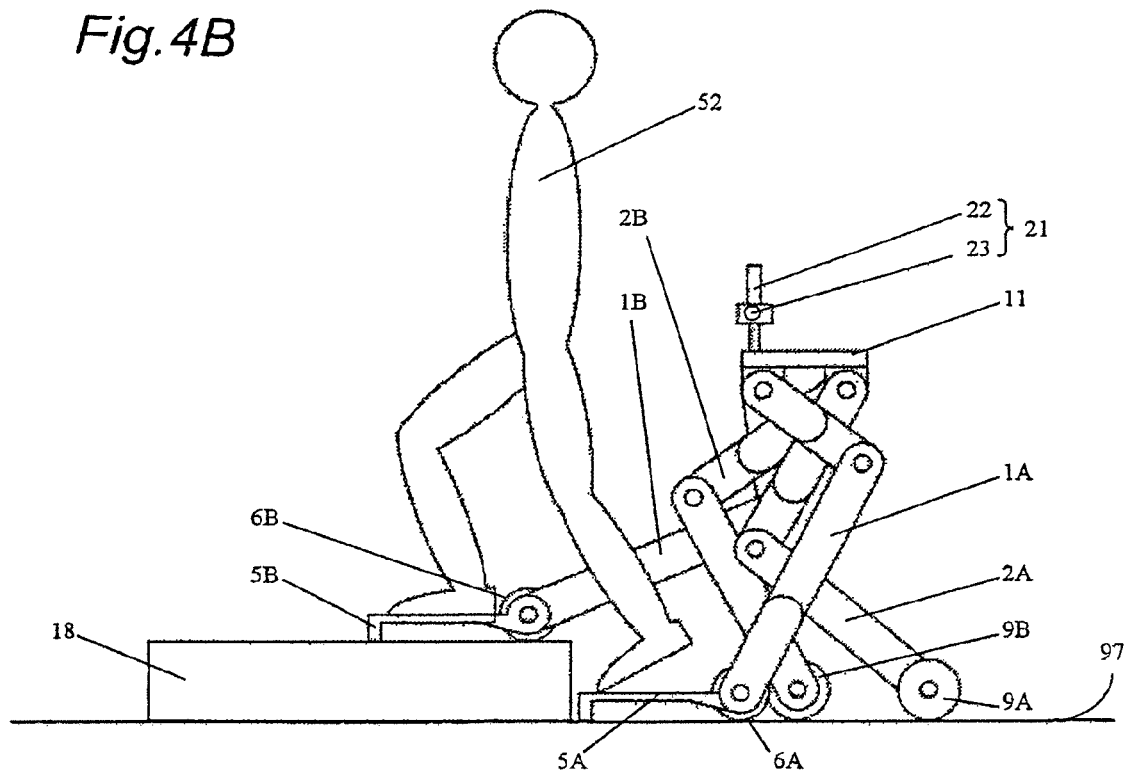
FIG. 4B is a side view that schematically shows step-difference ascending and descending operations of the leg-wheel traveling vehicle in accordance with the first embodiment of the present invention.

Here, the traveling mode refers to modes of the two link legs 1A, 1B, 2A, and 2B, as shown in FIG. 2A, when the leg-wheel traveling vehicle is traveling. The perpendicular seat-face mode refers to modes of two link legs 1A, 1B, 2A, and 2B where, as shown in FIG. 2B, the leg-wheel traveling vehicle is stopped from traveling, and the seat portion 11 is aligned along virtually the vertical direction (that is, along virtually a direction perpendicular to the ground). The mode prior to step-difference ascending and descending refers to modes of two link legs 1A, 1B, 2A, and 2B where, as shown in FIG. 4A, the leg-wheel traveling vehicle is stopped from traveling, with the seat portion 11 being aligned along the lateral direction, and the rider 52 is going up a step 18 from the ground 97 or the like. The modes of the leg-wheel vehicle in the step-difference ascending and descending operation refer to modes of the two link legs 1A, 1B, 2A, and 2B, where, as shown in FIG. 4B, the leg-wheel traveling vehicle is stopped from traveling with the seat portion 11 being aligned along the lateral direction and with the two link legs being operation-controlled so as to follow the rider 52 when the rider 52 is going up or going down the step 18 or walking on the step 18.

Next, the following description will discuss the functions of the leg-wheel traveling vehicle to be carried out under control of the controlling computer 101.

Figure 9A:
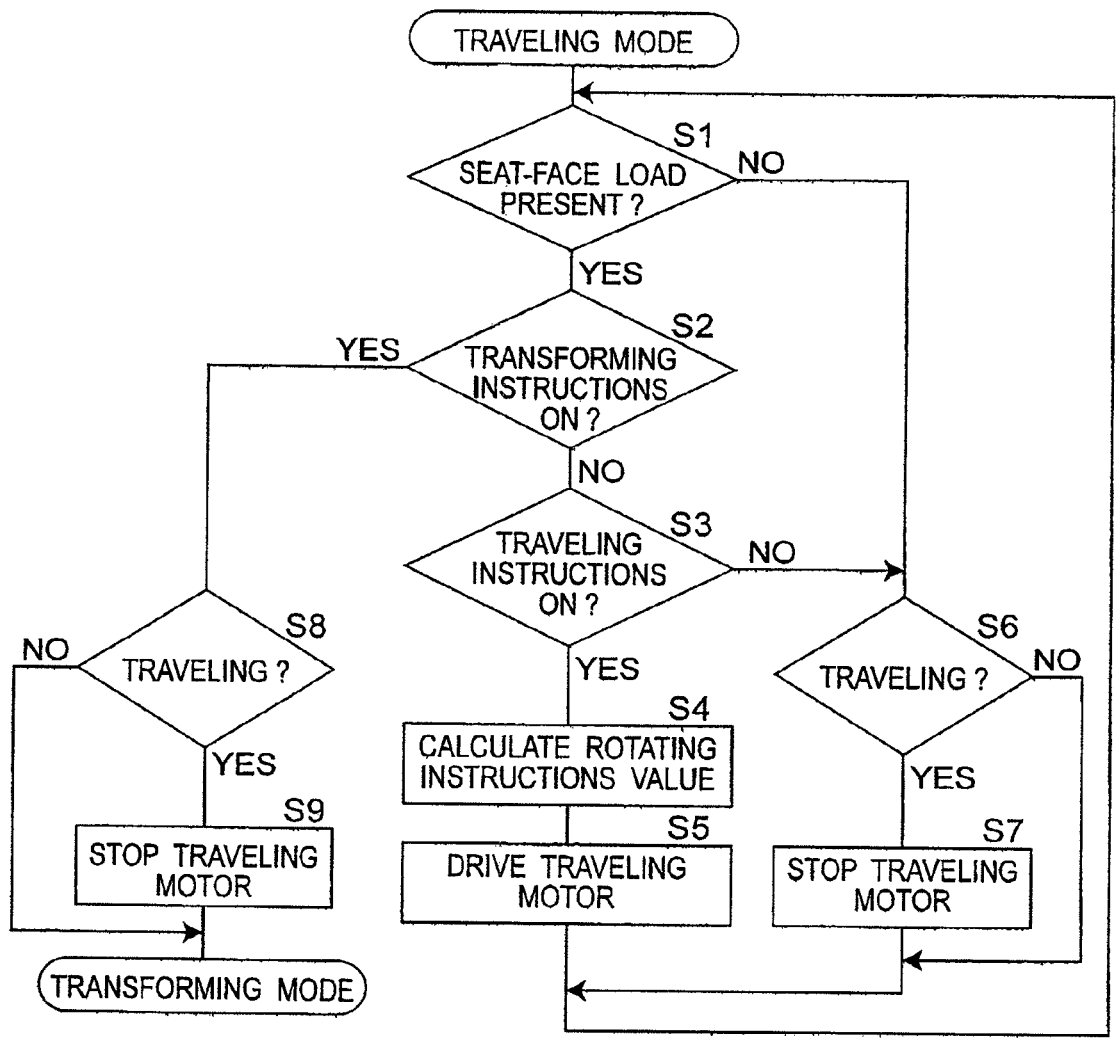
FIG. 9A is a flow chart that shows a traveling mode of the leg-wheel traveling vehicle.

First, in a case where the leg-wheel traveling vehicle travels on a plane, the two link legs 1A, 1B, 2A, and 2B of the leg-wheel traveling vehicle are transformed into the traveling mode as shown in FIG. 2A, with the rider 52 sitting on the seat portion 11, and are operated in accordance with a flow chart of the traveling mode as shown in FIG. 9A.

First, the presence or absence of a seat load is determined by the load sensor 12 serving as one example of a riding-state determining device for the seat portion 11 so that it is determined whether or not the rider 52 is sitting on the seat portion 11 (step S1 of FIG. 9A). More specifically, the controlling computer 101 determines whether or not the load sensor 12 has detected a value equal to or exceeding a predetermined value (for example, 10 kg), and when the load sensor 12 has detected the value equal to or exceeding the predetermined value, the controlling computer 101 determines that the rider 52 is sitting on the seat portion 11 (that is, a riding state), and the process proceeds to step S2. In contrast, when the load sensor 12 has detected a value less than the predetermined value, the controlling computer 101 determines that no rider 52 is sitting on the seat portion 11 (that is, non-riding state), and the process proceeds to step S6.

Next, when it has been determined in step S1 that the seat load is equal to or exceeds the predetermined value and that the rider 52 is sitting on the seat portion 11, the controlling computer 101 determines whether or not transforming instructions for the two link legs 1A, 1B, 2A, and 2B of the leg-wheel traveling vehicle have been inputted by the transformation instructing button 23 (step S2 in FIG. 9A). When no transforming instructions have been inputted, it is determined whether or not traveling instructions have been given by the joystick 22 (step S3 in FIG. 9A). Examples of the traveling instructions include advancing instructions or retreating instructions given by tilting the joystick 22 forward or backward, leftward turning instructions or rightward turning instructions given by tilting the joystick 22 leftward or rightward, or the like. When any of these traveling instructions have been inputted, respective numbers of revolutions of the rubber tires 9A and 9B serving as one example of rear-wheel driving wheels, required for achieving the input instructions, are calculated by the controlling computer 101 (step S4 in FIG. 9A). When no traveling instructions have been given by the joystick 22, that is, for example, when no tilt is given to the joystick 22, the process proceeds to step S6.

Next, based upon the results of the calculations, the controlling computer 101 drive-controls the motors 81 and 82, so that the rubber tires 9A and 9B are rotated by the respective numbers of revolutions based upon the results of the calculations (step S5 of FIG. 9A). Since the front wheels of the leg-wheel traveling vehicle are the universal wheels 6A and 6B that are one example of the driven wheels, by giving different turning instructions to the rubber tire 9A and the rubber tire 9B, the leg-wheel traveling vehicle can be turned around leftward or rightward. In a case of a normal traveling operation, the above-mentioned flow (steps S1 to S5 of FIG. 9A) is repeated.

In contrast, in a case where the load sensor 12 determines that no seat-face load is applied, that is, when no rider 52 is sitting on the seat portion 11 or when no traveling instructions are given through the joystick 22, that is, no tilt in the joystick 22 is given, the controlling computer 101 determines whether or not the leg-wheel traveling vehicle is traveling (step S6 in FIG. 9A) More specifically, the controlling computer 101 determines whether or not the traveling motors 81 and 82 are being rotation-driven. When the leg-wheel traveling vehicle is traveling in step S6, the rotations of the traveling motors 81 and 82 are stopped, so that the leg-wheel traveling vehicle is stopped (step S7 in FIG. 9A). Thereafter, the process returns to step S1. When the leg-wheel traveling vehicle is not traveling in step S6, the process returns to step S1.

Moreover, in a case where transforming instructions are inputted by the transformation instructing button 23 in step S2, the controlling computer 101 determines whether or not the leg-wheel traveling vehicle is traveling (step S8 in FIG. 9A). More specifically, the controlling computer 101 determines whether or not the traveling motors 81 and 82 are being rotation-driven. When the leg-wheel traveling vehicle is traveling in step S8, the rotations of the traveling motors 81 and 82 are stopped, so that the leg-wheel traveling vehicle is stopped (step S9 in FIG. 9A). Thereafter, the process proceeds to the transforming mode of the two link legs 1A and 1B as well as 2A and 2B of the leg-wheel traveling vehicle. When the leg-wheel traveling vehicle is not traveling in step S8, the process, as it is, proceeds to the transforming mode.

In the above-mentioned traveling mode, the controlling computer 101 maintains transformed states of the two link legs 1A and 1B as well as 2A and 2B, as long as no transforming instructions are inputted, regardless of foot position information such as rotation angles and relative positional changes from the rotary encoders 91A, 91B, 92A, and 92B as well as from the linear encoders 93A and 93B; therefore, even when the rider 52 moves his or her foot during traveling, a traveling operation is carried out without any problem with safety. Here, in the present embodiment, the load sensor 12 attached to the seat portion 11 is used for determining whether or not the current state is a traveling state; however, the means for making the determination on the traveling state is not particularly limited by this, and the determination may be given by instructions through the console 21, or may be made based upon a load or the like detected by a load sensor attached to a support leg, and used for detecting a load applied to the support leg.

Figure 9B:
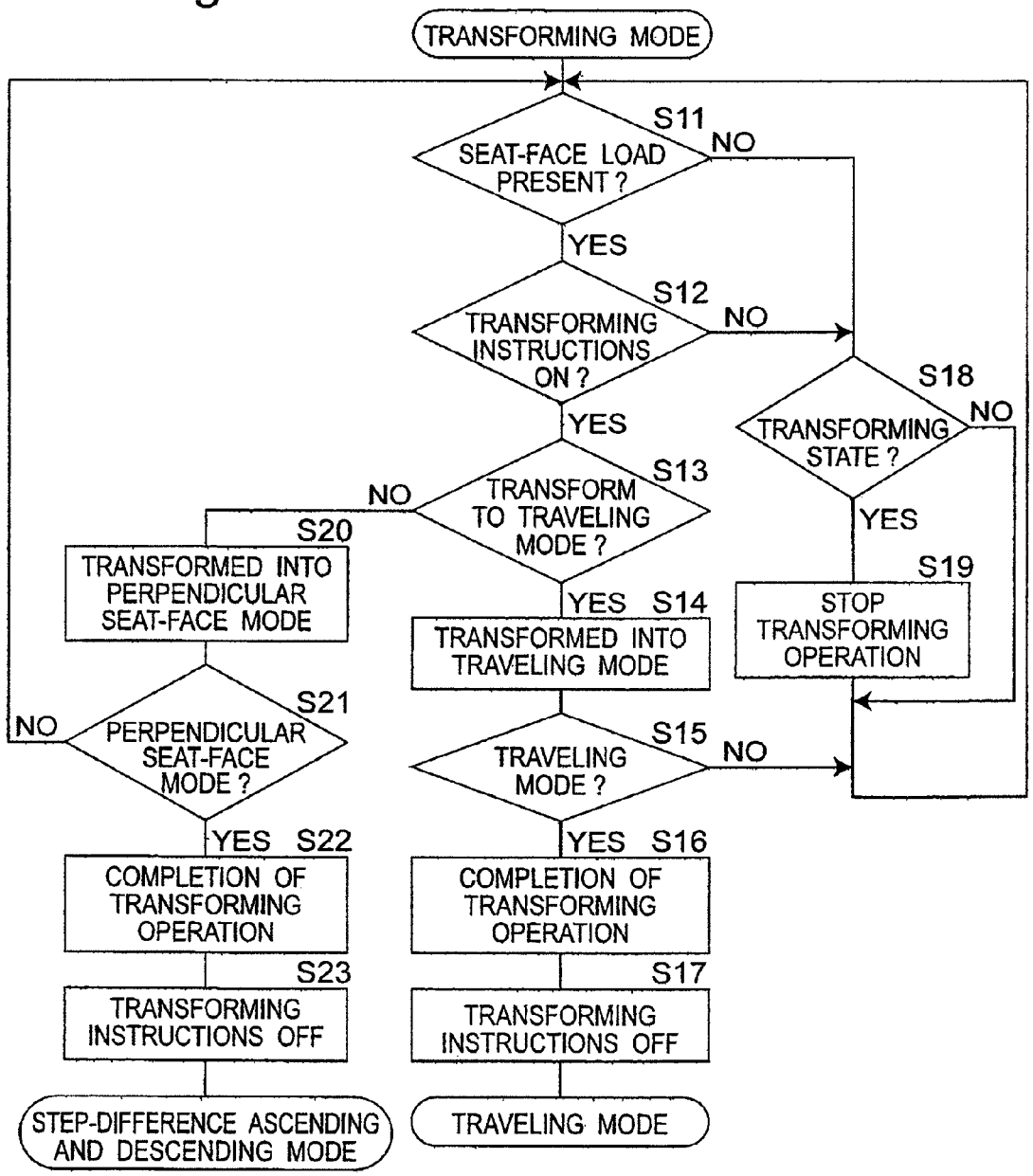
FIG. 9B is a flow chart that shows a transforming mode of the leg-wheel traveling vehicle.

Next, the following description will discuss the transforming mode that is carried out under control of the controlling computer 101, and allow the two link legs 1A, 1B, 2A, and 2B of the leg-wheel traveling vehicle to be transformed from the traveling mode shown in FIG. 2A to the perpendicular seat-face mode shown in FIG. 2B. FIG. 9B shows a flow chart of the transforming mode.

In the same manner as in the traveling mode, in the transforming mode also, first, the load sensor 12 of the seat portion 11 determines whether or not a seat-face load is applied so that it is determined whether or not the weight of the rider 52 is applied to the seat portion 11 (step S11 in FIG. 9B). More specifically, the controlling computer 101 determines whether or not the load sensor 12 has detected a value equal to or exceeding a predetermined value (for example, 3 kg), and when the load sensor 12 has detected the predetermined value or more, it is determined that the weight of the rider 52 is applied onto the seat portion 11, so that the process proceeds to step S12. In contrast, when the load sensor 12 has detected a value less than the predetermined value, it is determined that the weight of the rider 52 is not applied onto the seat portion 11, so that the process proceeds to step S18.

When the weight of the rider 52 is applied onto the seat portion 11, the controlling computer 101 determines whether or not the transforming instructions given through the transformation instructing button 23 has been released (step S12 in FIG. 9B). In a case where the controlling computer 101 determines that the transforming instructions have been released, the process proceeds to step S18. In a case where the controlling computer 101 determines that transforming instructions have not been released, the process proceeds to step S13.

In step S18, the controlling computer 101 determines whether or not the leg-wheel traveling vehicle is carrying out any transforming operations on the two link legs 1A, 1B, 2A, and 2B (step S18 in FIG. 9B). Upon determination by the controlling computer 101 that the leg-wheel traveling vehicle is carrying out a transforming operation on the two link legs 1A, 1B, 2A, and 2B, the transforming operation is stopped (step S19 in FIG. 9B) so as to ensure safety. That is, in step S18, operations are carried out on the premise that no seat-face load is applied (No in step S11 in FIG. 9B) or that transforming instructions are released (No in step S12 in FIG. 9B) so that, since it is dangerous to continue the transforming operation of the two link legs 1A, 1B, 2A, and 2B in this state, the transforming operation is stopped to ensure safety.

In contrast, in a case where the weight of the rider 52 is supported on the seat portion 11 (Yes in step S11 in FIG. 9B), with the transforming instructions are being continuously maintained (Yes in step S12 in FIG. 9B), the controlling computer 101 drives the joint driving motors 61, 62, 63, 64, 65; 67, and 68 of the two link legs 1A, 1B, 2A, and 2B and the foot-rest rotating motors 71 and 72 into the traveling mode or the perpendicular seat-face mode instructed by the joystick 22, so that the two-link legs 1A, 1B, 2A, and 2B are transformed (steps S13, S14 and S20 in FIG. 9B).

More specifically, in step S13, the controlling computer 101 determines whether or not the two link legs 1A and 1B as well as 2A and 2B have been instructed to be transformed into the traveling mode. When the controlling computer 101 determines that the instructions to be transformed into the traveling mode have been given, the process proceeds to step S14. When the controlling computer 101 determines that the instructions to be transformed into the traveling mode are not given, the process proceeds to step S20.

In step S14, the controlling computer 101 drives the respective joint driving motors 61, 62, 63, 64, 65, 66, 67, and 68 and the foot-rest rotating motors 71 and 72 so that the two link legs 1A and 1B as well as 2A and 2B are transformed into the traveling mode. Thereafter, the process proceeds to step S15.

In step S15, the controlling computer 101 determines whether or not the traveling mode has been attained. More specifically, it is detected whether or not the respective rotation shafts 10A to 10J have reached the rotation angles of the respective rotation shafts 10A to 10J in the traveling mode preliminarily stored in the storage device 102 so that the determinations can be made by the controlling computer 101. Upon determination by the controlling computer 101 that the traveling mode has been attained, the process proceeds to step S16. Upon determination by the controlling computer 101 that the traveling mode has not been attained, the process returns to step S1.

In step S16, the controlling computer 101 stops the driving operations of the respective joint driving motors 61, 62, 63, 64, 65, 66, 67, and 68 and the foot-rest rotating motors 71 and 72 so that the transforming operations of the two link legs 1A and 1B as well as 2A and 2B are completed.

Next, in step S17, the controlling computer 101 releases the transforming instructions given by the transformation instructing button 23, and the process proceeds to the traveling mode.

In contrast, in a case where, in step S13, the controlling computer 101 has determined that no instructions for transformations into the traveling mode are given, transformations are carried out so as to enter the perpendicular seat-face mode in step S20. That is, the controlling computer 101 drives the respective joint driving motors 61, 62, 63, 64, 65, 66, 67, and 68 as well as the foot-rest rotating motors 71 and 72 so that the two link legs 1A and 1B as well as 2A and 2B are transformed into the perpendicular seat-face mode. Thereafter, the process proceeds to step S21.

Next, in step S21, the controlling computer 101 determines whether or not the two link legs 1A and 1B as well as 2A and 2B have reached the perpendicular seat-face mode. More specifically, it is detected whether or not the respective rotation shafts 10A to 10J have reached the rotation angles of the respective rotation shafts 10A to 10J in the perpendicular seat-face mode preliminarily stored in the storage device 102 so that the determinations can be made by the controlling computer 101. Upon determination by the controlling computer 101 that the perpendicular seat-face mode has been attained, the process proceeds to step S22. Upon determination by the controlling computer 101 that the perpendicular seat-face mode has not been attained, the process returns to step S11.

In step S22, the controlling computer 101 stops the driving operations of the respective joint driving motors 61, 62, 63, 64, 65, 66, 67, and 68 and the foot-rest rotating motors 71 and 72 so that the transforming operations of the two link legs 1A and 1B as well as 2A and 2B are completed.

Next, in step S23, after the transforming instructions by the transformation instructing button 23 have been released by the controlling computer 101, the process proceeds to the step-difference ascending and descending mode.

In the transforming mode, since the leg-wheel traveling vehicle has an effect for helping the rider 52 to attain a stand-up state, it is possible to quickly shift to the step-difference ascending and descending operations. Here, during the transforming operations, while the angle of each of the foot-rest portion 5A and the foot-rest portion 5B, made relative to the ground 97, is changed in cooperation with the angle of the seat portion 11, each of the foot-rest portion 5A and foot-rest portion 5B is preferably maintained horizontally relative to the ground 97, or with its tip portion, for example, its front end portion, being kept higher than its rear end portion relative to the ground 97, until the perpendicular seat-face mode has been attained. With this arrangement, during the transforming operations of the two link legs 1A and 1B as well as 2A and 2B, the foot-rest portion 5A and the foot-rest portion 5B are always maintained in a state in parallel with the ground 97 or with an angle tilting diagonally downward toward the seat portion 11, with the result that the rider 52 is allowed to naturally put his or her weight onto the seat portion 11. Consequently, since the rider 52 is allowed to stand up in accordance with the transformations of the two link legs 1A and 1B as well as 2A and 2B of the leg-wheel traveling vehicle, without standing up on his or her own will; thus, it is possible to carry out the transforming operations in a safer state. For example, in a state of the seat portion 11 being maintained horizontally to the ground 97, the angle of each of the foot-rest portion 5A and the foot-rest portion 5B relative to the ground 97 is set to 30 degrees, and as the angle of the seat portion 11 relative to the ground 97 is varied to 30 degrees, 60 degrees, and so on, the angle of each of the foot-rest portion 5A and the foot-rest portion 5B relative to the ground 97 is preferably reduced to 20 degrees, 10 degrees, and so on, and at a stage where the seat portion 11 is made perpendicular to the ground 97, each of the foot-rest portion 5A and the foot-rest portion 5B is made horizontal to the ground 97; these operations or the like are preferably executed.

Lastly, the following description will discuss the step-difference ascending and descending mode in which step-difference ascending and descending operations are carried out. FIG. 9C shows a flow chart for the step-difference ascending and descending mode.

First, in step S31, the controlling computer 101 determines whether or not the two link legs 1A, 1B, 2A, and 2B are maintained in the perpendicular seat-face mode. Upon determination as the perpendicular seat-face mode by the controlling computer 101, the process proceeds to S32. Otherwise, the process proceeds to step S34.

Next, in step S32, the load sensor 12 of the seat portion 11 determines whether or not the seat-face load is present so that it is determined whether or not the rider 52 puts his or her weight onto the seat portion 11 (step S32 in FIG. 9A). More specifically, the controlling computer 101 determines whether or not the load sensor 12 has detected a value that is a predetermined value (for example, 3 kg) or more, and upon detection of the value that is the predetermined value or more by the load sensor 12, the controlling computer 101 determines that the rider 52 puts his or her weight on the seat-face portion 11 so that the process returns to step S31. In contrast, upon detection of a value less than the predetermined value by the load sensor 12, the controlling computer 101 determines that the rider 52 does not put his or her weight on the seat portion so that the process proceeds to step S33.

Next, in step S33, the two link legs 1A, 1B, 2A, and 2B are transformed into a state prior to the step-difference ascending and descending operation. That is, at a stage where a mode shift is made from the transforming mode to the step-difference ascending and descending mode, the two link legs 1A, 1B, 2A, and 2B of the leg-wheel traveling vehicle are maintained in the perpendicular seat-face state shown in FIG. 2B (Yes in step S31 in FIG. 9C), so that the rider 52 is in a standing position with his or her weight putting on the seat portion 11. At a stage where the rider 52 has left from the seat portion 11 and come into a self-standing state, and when the load sensor 12 determines that no seat load is applied (No in step S32 in FIG. 9C), the controlling computer 101 drives the joint-driving motors 61, 62, 63, 64, 65, 66, 67, and 68 of the two link legs 1A, 1B, 2A, and 2B and the foot-rest driving motors 71 and 72, so that the two link legs 1A, 1B, 2A, and 2B of the leg-wheel traveling vehicle are transformed into those two link legs 1A, 1B, 2A, and 2B in the mode prior to the step-difference ascending and descending operation, as shown in FIG. 4A (step S33 in FIG. 9C).

Next, in step S34, the controlling computer 101 determines itself as to whether or not it is executing a follow-up-controlling operation of the two link leg 1A, and when the follow-up-controlling operation is being executed, the process proceeds to step S43, and when the follow-up-controlling operation is not being executed, the process proceeds to step S35.

Next, in step S35, the controlling computer 101 determines itself as to whether or not it is executing a follow-up-controlling operation of the two link leg 1B, and when the follow-up-controlling operation is being executed, the process proceeds to step S46, and when the follow-up-controlling operation is not being executed, the process proceeds to step S36.

Next, in step S36, the controlling computer 101 determines whether or not the relative positional change between the foot-rest portion 5A and the left foot portion 51A of the rider 52 is equal to or exceeds a predetermined threshold value (for example, 40 mm). When the controlling computer 101 has determined that the value is equal to or more than the threshold value (for example, 40 mm), the process proceeds to step S45, and when the controlling computer 101 has determined that the value is less than the threshold value, the process proceeds to step S37. More specifically, based upon input information from the rotary encoder 91A, the linear encoder 93A, and the rotary encoder 92A, the controlling computer 101 is allowed to determine whether or not the relative positional change between the foot-rest portion 5A and the left foot portion 51A of the rider 52 (for example, the size of vector difference between the current vector and the initial state vector, each of which connects the axis center of the rotation shaft 13C of the cover 16A and the axis center of the rotation shaft 13A of the foot-rest portion 5A in FIG. 3B, in the coordinates system made based upon the foot-rest portion 5A) is equal to or exceeds a threshold value (for example, 40 mm).

Next, in step S37, the controlling computer 101 determines whether or not the relative positional change between the foot-rest portion 5B and the right foot portion 51B of the rider 52 is equal to or exceeds a predetermined threshold value (for example, 40 mm). When the controlling computer 101 has determined that the value is equal to or more than the threshold value (for example, 40 mm), the process proceeds to step S48, and when the controlling computer 101 has determined that the value is less than the threshold value, the process proceeds to step S38. More specifically, based upon input information from the rotary encoder 91B, the linear encoder 93B, and the rotary encoder 92B, the controlling computer 101 is allowed to determine whether or not the relative positional change between the foot-rest portion 5B and the right foot portion 51B of the rider 52 (for example, the size of vector difference between the current vector and the initial state vector, each of which connects the axis center of the rotation shaft 13D of the cover 16B and the axis center of the rotation shaft 13B of the foot-rest portion 5B in FIG. 3C, in the coordinates system made based upon the foot-rest portion 5B) is equal to or exceeds a threshold value (for example, 40 mm).

Next, in step S38, the controlling computer 101 determines whether or not ascending and descending operations of the two link legs 1A and 1B have been completed. More specifically, the controlling computer 101 determines whether or not completion conditions, which will be described later (see the description of FIG. 4D), have been satisfied, and when the conditions have been satisfied, the process proceeds to step S39. When the conditions have not been satisfied, the process returns to step S31. The ascending and descending operations of the two link legs 1A and 1B indicate a process of operations in which follow-up controlling operations of one or more times are carried out respectively on the two link legs 1A and 1B so that both of the foot-rest portions 5A and 5B are shifted from the ground 97 to a step 18 or from the step 18 to the ground 97.

Next, in step S39, the controlling computer 101 determines itself as to whether or not the ascending and descending operations of the two link legs 2A and 2B have been executed. More specifically, the controlling computer 101 determines whether or not the rubber tires 9A and 9B have vertically moved by amounts of movements corresponding to vertical amounts of movements of the foot-rest portions 5A and 5B or the universal wheels 6A and 6B caused by the step-difference ascending and descending operations of the two link legs 1A and 1B, which are calculated by the controlling computer 101 based upon the angles of the respective rotation shafts 10A to 10D and 10G to 10J at the time of the completion of the ascending and descending operations of the two link legs 1A and 1B, stored in the storage device 102, based upon angles of the respective rotation shafts 10A to 10D and 10G to 10J at that time, and in a case where vertical movements have not been made (that is, ascending and descending operations have not been completed), the process proceeds to step S40, thereby carrying out the ascending and descending operations. In a case where the vertical movements have been made (that is, ascending and descending operations have been completed), the process proceeds to step S41. In this case, the ascending and descending operations of the two link legs 2A and 2B indicate a process of operations in which, after completion of the ascending and descending operations of the two link legs 2A and 2B, both of the rubber tires 9A and 9B are shifted from the ground 97 to the step 18 or from the step 18 to the ground 97. These operations are automatically executed by the controlling computer 101 from the start to the completion.

Next, in step S40, the ascending and descending operations of the two link legs 2A and 2B are carried out, while the respective joint-driving motors 65, 66, 67, and 68 (while the respective joint-driving motors 61, 62, 63, and 64 are also being driven, if necessary) are being driven by the controlling computer 101, and the process then proceeds to step S41.

Next, in step S41, the controlling computer 101 determines whether or not any transforming instructions for the two link legs 1A, 1B, 2A, and 2B of the leg-wheel traveling vehicle have been given by the transformation instructing button 23. When no transforming instructions have been given, the process returns to step S31. When any transforming instructions have been given, the process proceeds to step S42.

Next, in step S42, transformations are made into the perpendicular seat-face mode. That is, the controlling computer 101 drives the respective joint-driving motors 61, 62, 63, 64, 65, 66, 67, and 68 as well as the foot-rest rotating motors 71 and 72 so that the two link legs 1A, 1B, 2A, and 2B are transformed into the perpendicular seat-face state shown in FIG. 2B. Thereafter, the process proceeds to the transforming mode.

Here, in step S43, in a case where the two link leg 1A is being under follow-up control in step S34, the controlling computer 101 determines whether or not the foot-rest portion 5A has been landed on the ground 97 or the like. More specifically, the controlling computer 101 determines whether or not the landing sensor 17A of the foot-rest portion 5A has detected the landing of the foot-rest portion 5A onto the ground 97 or the like. Upon detection of the landing of the foot-rest portion 5A by the landing sensor 17A, the process proceeds to step S44, while, when the landing sensor 17A has not detected the landing of the foot-rest portion 5A, the process returns to step S31.

In step S44, after the completion of the follow-up control of the two link leg 1A by the controlling computer 101, the process returns to step S31.

Moreover, in step S45, when the relative positional change between the foot-rest portion 5A and the left foot portion 51A of the rider 52 is equal to or more than the predetermined threshold value (for example, 40 mm) in step S36, the controlling computer 101 starts the follow-up control of the two link leg 1A. That is, when the rider 52 starts walking with the left foot stepping forward, from the state corresponding to the mode prior to the step-difference ascending and descending operation of the two link legs 1A, 1B, 2A, and 2B, the controlling computer 101 appropriately drives the joint-driving motors 61 and 62 of the two link leg 1A and the foot-rest rotating motor 71 so that the two link leg 1A starts the follow-up control so as to allow the foot-rest portion 5A to follow up the left-foot portion 51A. Simultaneously, in order to maintain the balance of the leg-wheel traveling vehicle, the controlling computer 101 appropriately drives the respective joint-driving motors 63, 64, 65, 66, 67, and 68 of the two link legs 1B, 2A, and 2B and foot-rest rotating motor 72. Thereafter, the process returns to step S31.

Moreover, in step S48, when the relative positional change between the foot-rest portion 51 and the right foot portion 51B of the rider 52 is equal to or more than the predetermined threshold value (for example, 40 mm) in step S37, the controlling computer 101 starts the follow-up control of the two link leg 1B. That is, when the rider 52 starts walking with the left foot stepping forward, from the state corresponding to the mode prior to the step-difference ascending and descending operation of the two link legs 1A, 1B, 2A, and 2B, the controlling computer 101 drives the joint-driving motors 63 and 64 of the two link leg 1B and the foot-rest rotating motor 72 on demand so that the two link leg 1B starts the follow-up control so as to allow the foot-rest portion 5B to follow up the right foot portion 51B. Simultaneously, in order to maintain the balance of the leg-wheel traveling vehicle, the controlling computer 101 drives the respective joint-driving motors 61, 62, 65, 66, 67, and 68 of the two link legs 1A, 2A, and 2B and foot-rest rotating motor 71 on demand. Thereafter, the process returns to step S31.

Here, in step S46, in a case where the two link leg 1B is being under the follow-up control in step S35, the controlling computer 101 determines whether or not the foot-rest portion 5B has been landed on the ground 97 or the like. More specifically, the controlling computer 101 determines whether or not the landing sensor 17B of the foot-rest portion 5B has detected the landing of the foot-rest portion 5B onto the ground 97 or the like. Upon detection of the landing of the foot-rest portion 5B by the landing sensor 17B, the process proceeds to step S47, while, when the landing sensor 17B has not detected the landing of the foot-rest portion 5B, the process returns to step S31.

In step S47, after the completion of the follow-up control of the two link leg 1B by the controlling computer 101, the process returns to step S31.

Figure 6A:
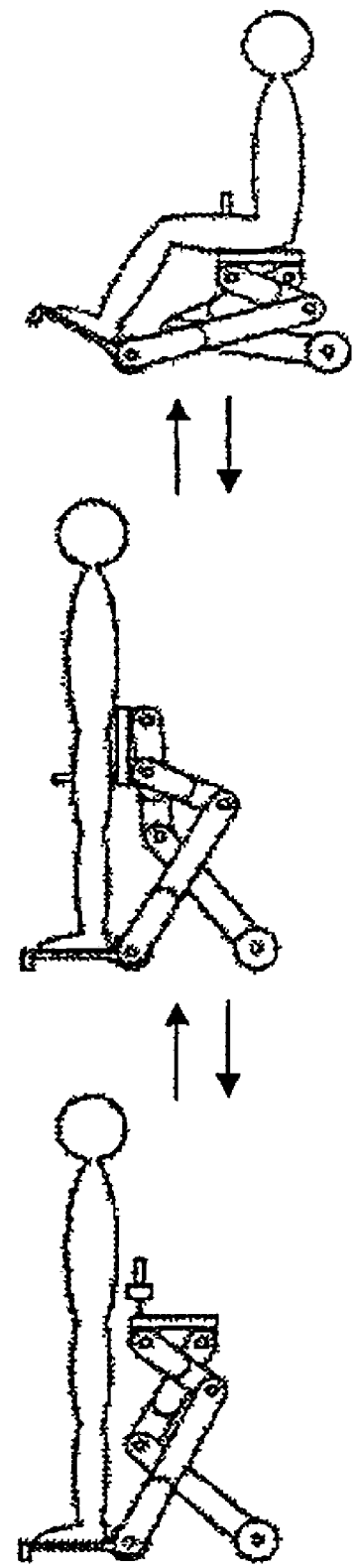
FIG. 6A is a view that shows transitions of states of the leg-wheel traveling vehicle over a traveling mode, a perpendicular seat-face mode, and a mode prior to a step-difference ascending and descending operation.

The above-description has discussed the operation flow of the step-difference ascending and descending mode in which the step-difference ascending and descending operations are carried out. Here, the transition of the shape changes of the two link legs 1A, 1B, 2A, and 2B from the traveling mode to the step-difference ascending and descending operation is shown by a flow from the upper end figure to the lower end figure in FIG. 6A. In contrast, the transition of the shape changes of the two link legs 1A, 1B, 2A, and 2B from the step-difference ascending and descending mode to the traveling mode is shown by a flow from the lower end figure; to the upper end figure in FIG. 6A, and the transition is made into the traveling mode in accordance with the above-mentioned flow.

Figure 6B:
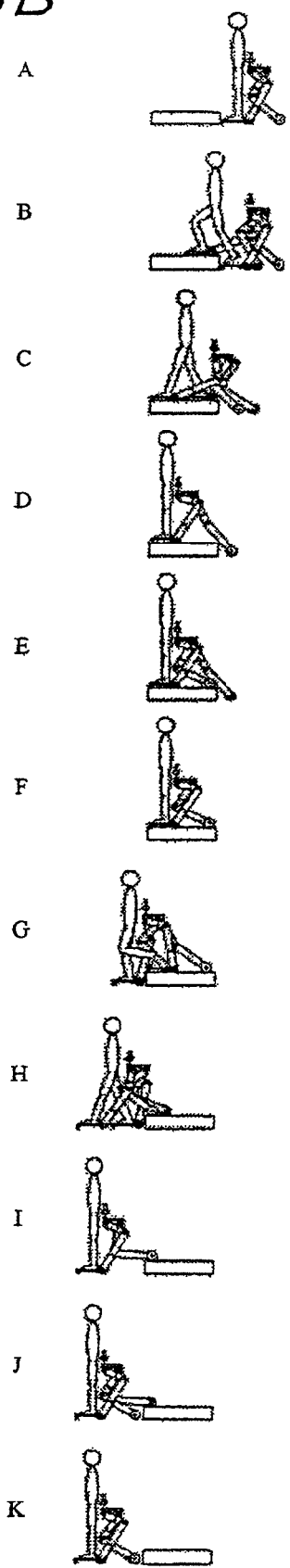
FIG. 6B is a view that shows transitions of modes of the leg-wheel traveling vehicle in the step-difference ascending and descending operations.
Figure 8:
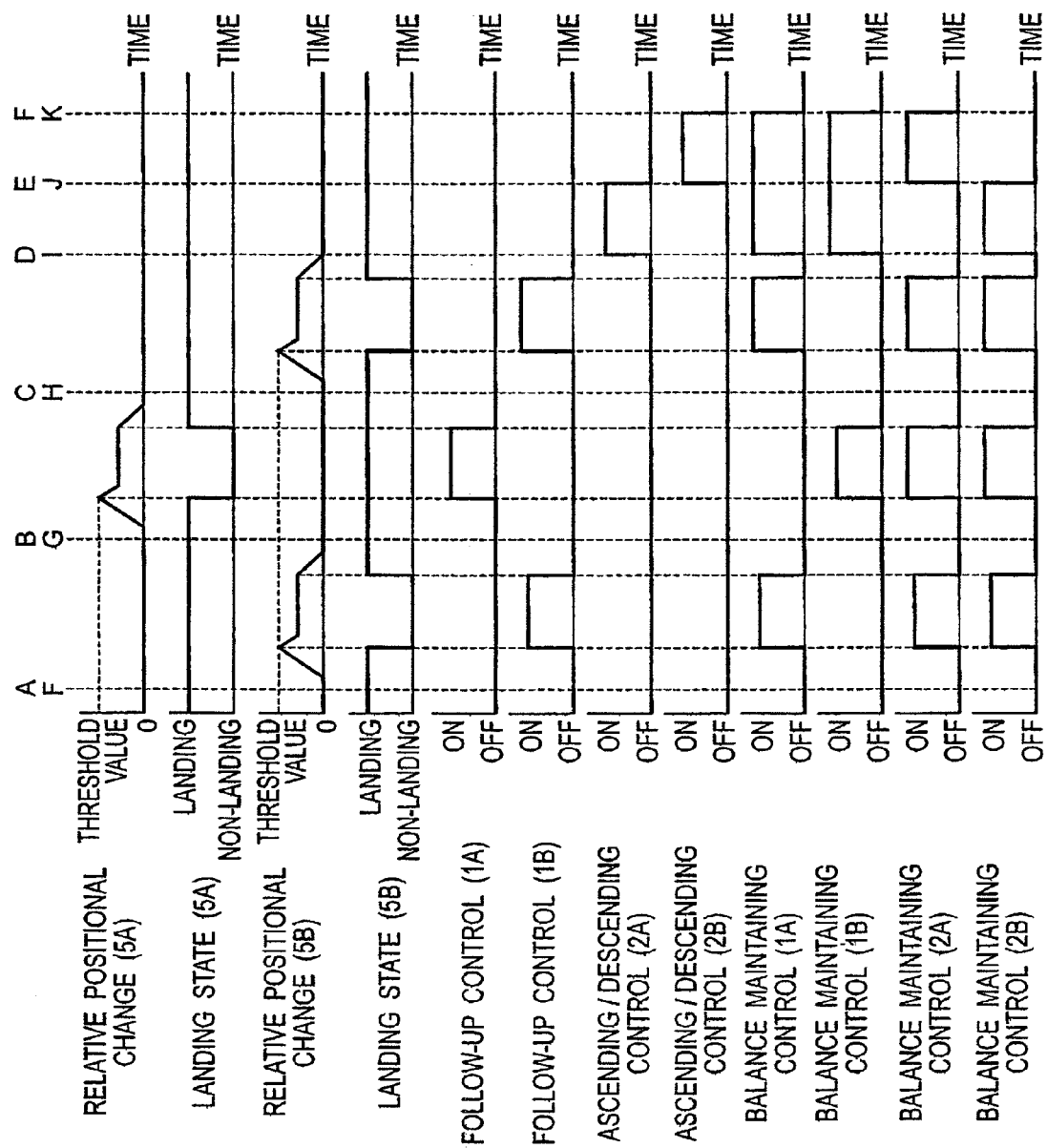
FIG. 8 is a timing chart corresponding to the step-difference ascending and descending operations of the leg-wheel traveling vehicle.

Next, by reference to the flow chart of the aforementioned step-difference ascending and descending mode in FIG. 9C, the following description will discuss a process of operations by which from the state shown in FIG. 4A, the step-difference ascending and descending operations are actually carried out. Here, description will be given by exemplifying a case where the step-difference ascending operation and the step-difference descending operation are continuously carried out. FIG. 6B shows a flow of a process of operations of the leg-wheel traveling vehicle at this time, and FIG. 8 shows a timing chart at this time. Symbols A to K in FIGS. 6B and 8 respectively correspond to states shown in FIGS. 4A to 4K. During the operations from FIG. 4A to FIG. 4B, when the right foot portion 51B of the rider 52 is released from the foot-rest portion 5B, the controlling computer 101 obtains a relative positional change between the foot-rest portion 5B and the right foot portion 51B of the rider 52, based upon the length of the slide rod 14B and the rotation angles of the rotation shafts 13B and 13D, detected by the linear encoder 93B, the rotary encoder 91B, and the rotary encoder 92B. The controlling computer 101 continuously executes on the above-mentioned detection and relative positional change calculation, until the relative positional change to be obtained has been equal to or exceeded a predetermined threshold value (for example, 40 mm) (step S37 in FIG. 9C) Moreover, from the point of time at which a value equal to or more than the threshold value has been detected, the controlling computer 101 carries out feedback controls in which the joint-driving motors 63 and 64 as well as the foot-rest rotating motor 72 are drive-controlled based upon information of the length of the slide rod 14B and the rotation angles of the rotation shafts 13B and 13D, detected by the linear encoder 93B, the rotary encoder 91B, and the rotary encoder 92B, so as to allow the relative positional change between the foot-rest portion 5B and the right-foot portion 51B of the rider 52 to be maintained within a constant range (for example, 20 mm±10 mm); thus, the controlling process of the transformed state of the follow-up leg, more specifically, the follow-up control of the foot-rest portion 5B to the right-foot portion 51B of the rider 52 by the two link leg 1B is carried out (step S48 in FIG. 9C).

With respect to the relative positional change upon follow-up operating the foot-rest portion 5B, in a case where the relative positional change is too big (for example, a relative positional change exceeding 50 mm), the follow-up operation becomes insufficient, and since the step-difference ascending and descending operations of the rider 52 and the follow-up operations of the foot-rest portion 5B are not properly executed in cooperation with each other, it is not possible to ensure the safety. In contrast, in a case where the relative positional change is too small (for example, a relative positional change of less than 10 mm), the idle leg (right-foot portion 51B) of the rider 52 tends to easily come into contact with the foot-rest portion 5B, thereby increasing the possibility of failure to ensure the safety of the leg-wheel traveling vehicle. In order to solve both of these issues, the controlling device 101 desirably controls the operations so that the relative positional change between the right-foot portion 51B and the foot-rest portion 5B (for example, the size of vector difference between the current vector and the initial state vector, each of which connects the axis center of the rotation shaft 13D of the cover 16B and the axis center of the rotation shaft 13B of the foot-rest portion 5B in FIG. 3C, in the coordinates system made based upon the foot-rest portion 5B) is limited to a range of from about 10 mm to 50 mm. Moreover, the controlling device 101 may divide the relative positional change (vector in the coordinates system based upon the foot-rest portion 5B) into the horizontal component and the vertical component, and control each of the components so as to be limited to a fixed range; thus, it becomes possible to further enhance the safety. In a case where the relative positional change is simply limited to a fixed range, there is a possibility that the horizontal component of the relative positional change becomes greater, with the vertical component being made smaller; consequently, the right-foot portion 51B of the rider 52 and the foot-rest portion 5B tends to come into contact with each other, thereby impairing the safety of the leg-wheel traveling vehicle. Therefore, when the controlling device 101 divides the relative positional change into the horizontal component and the vertical component, and controls the vertical component so as to be limited to a fixed range (for example, 20 mm±10 mm), with the horizontal component being limited to a fixed range (for example, ±10 mm), the right-foot portion 51B of the rider 52 and the foot-rest portion 5B are hardly made in contact with each other, making it possible to reduce the possibility of impairing the safety.

In this case, it is preferable to carry out the follow-up operation with the plate face of the foot-rest portion 5B being in parallel with the plate face of the cover 16B, from the viewpoint that the follow-up control is executed in a closer state of these members. Moreover, it is preferable to carry out the follow-up operation, while the foot-rest portion 5B is kept in parallel with the ground 97, with the minimum distance between the foot-rest portion 5B and the cover 16B being regarded as the relative distance, from the view points that the two link leg 1B can be easily operated for the follow-up control and that the contact with the ground 97 is evenly maintained.

Thereafter, with the two link leg 1B being under the follow-up control (step S35 in FIG. 9C), when the right-foot portion 51B of the rider 52 approaches the upper face of the step 18, the foot-rest portion 5B is landed on the step 18 (step S46 in FIG. 9C), so that the controlling computer 101 determines that the foot-rest portion 5B is in the landed state from the outputs of the landing sensors 17B and 17D. In the landed state, the controlling computer 101 completes the follow-up control of the two link leg 1B, and then, only tries to maintain the transformed states of the two link legs 1A, 1B, 2A, and 2B (step S47 in FIG. 9C). In this state, since the foot-rest portion 5B is kept in the landed state, without causing unnecessary movements, the rider 52 is allowed to lower the right-foot portion 51B onto the foot-rest portion 5B in a safe state. At this time, by setting the threshold value (for example, 40 mm) at which the follow-up operation is started to a value greater than the largest value (for example, 30 mm) in the relative positional change range (for example, 20 mm±10 mm) at the time of the follow-up operation, it becomes possible to avoid such a problem in which the follow-up operation is resumed immediately after the landing.

On the other hand, the controlling computer 101 carries out the follow-up control of the two link leg 1B (step S47 in FIG. 9C) by using the driving devices such as the joint-driving motors 63 and 64 as well as the foot-rest rotating motor 72, and simultaneously drive-controls the respective driving devices, such as the joint-driving motors 61, 62, 65, 66, 67, and 68, the foot-rest rotating motor 71, and the traveling motors 81 and 82 at the remaining two link legs 1A, 2A, and 2B so that the controlling computer 101 carries out the operation control to maintain the balance of the leg-wheel traveling vehicle. Upon controlling the two link leg 1B to follow up the right-foot portion 51B of the rider 52, since the leg-wheel traveling vehicle is held by the three legs of the two link legs 1A, 2A, and 3B, it is necessary to change the range of the position of the center of gravity of the leg-wheel traveling vehicle so as to maintain the stability of the leg-wheel traveling vehicle, and also to transform the shapes of the two link legs 1A, 2A and 2B so as to maintain the stability of the leg-wheel traveling vehicle, by using movements of the seat portion 11 in accordance with the change in the center of the gravity of the two link leg 1B due to the transformed two link leg 1B and the movements of the two link leg 1B. Various known techniques in the leg control for multi-leg robots in which stability determination depending on the position of the center of gravity or ZMP is utilized can be applied to such a balance maintaining control. During the state from the mode prior to the step-difference ascending and descending operation of FIG. 4A to the mode immediately after the start of the step-difference ascending and descending operation, the two link leg 2B is allowed to move forward by the driving control for the respective driving devices of the controlling computer 101 so that the stability of the leg-wheel traveling vehicle is maintained. Moreover, as clearly shown by the flowchart of FIG. 9C, since no follow-up control of the two link leg 1A is carried out when the two link leg 1B is under the follow-up control, the two link leg 1A is operated so as to maintain the balance of the leg-wheel traveling vehicle, even in the event of the left-foot portion 51A leaving from the foot-rest portion 5A due to, for example, the fact that the rider 52 fails to keep his or her body balance; thus, it becomes possible to maintain the stability.

Figure 4C:
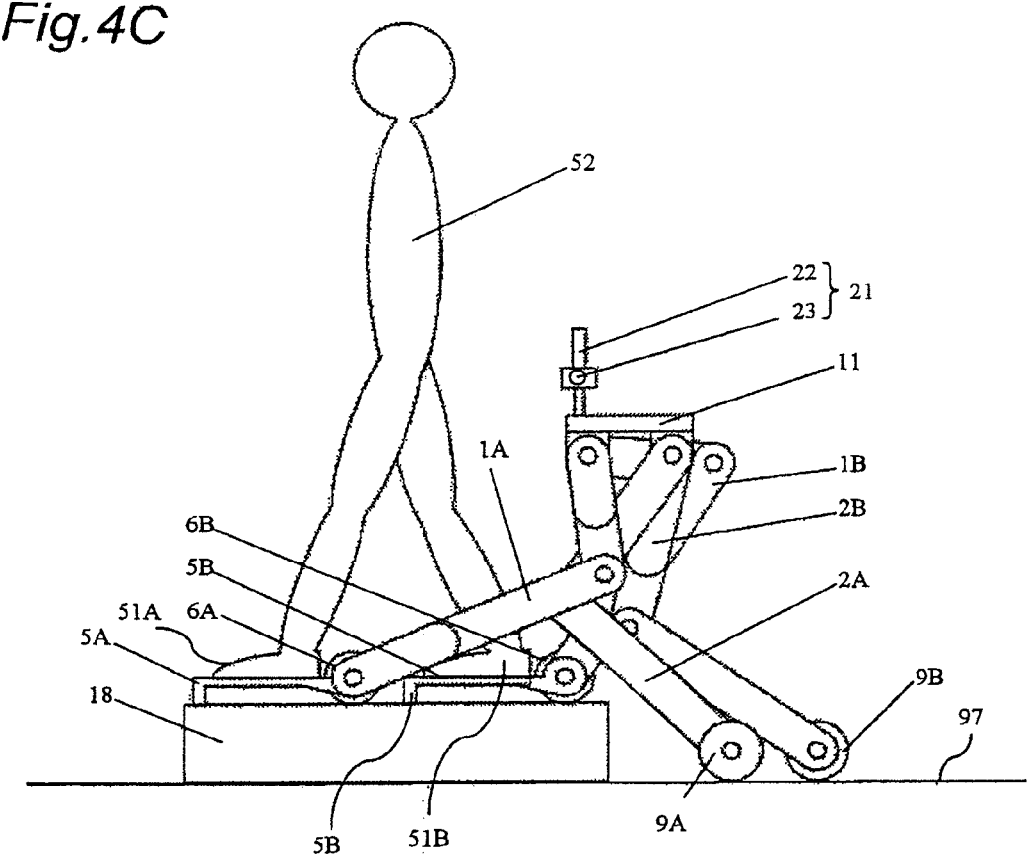
FIG. 4C is a side view that schematically shows step-difference ascending and descending operations of the leg-wheel traveling vehicle in accordance with the first embodiment of the present invention.

During a change from the mode immediately after the start of the step-difference ascending and descending operation in FIG. 4B to the walking mode on the step difference of FIG. 4C, basically the same change from FIG. 4A to FIG. 4D (step S36, step S45, step S34, step S43, and step S44 in FIG. 9C) is made except that the two link leg 1A is operation-controlled by the controlling computer 101, with the right side and the left side of the two link legs being switched to each other, so as to allow the left-foot portion 5A to follow up the left foot portion 51A of the rider 52 so that the two link leg 1B is balance-controlled. With respect to the balance maintaining control, since the seat portion 11 also moves forward as the two link leg 1A is follow-up controlled, not only the two link leg 2A moves forward, but also the two link legs 1B and 2B are operated so as to be transformed.

Figure 4D:
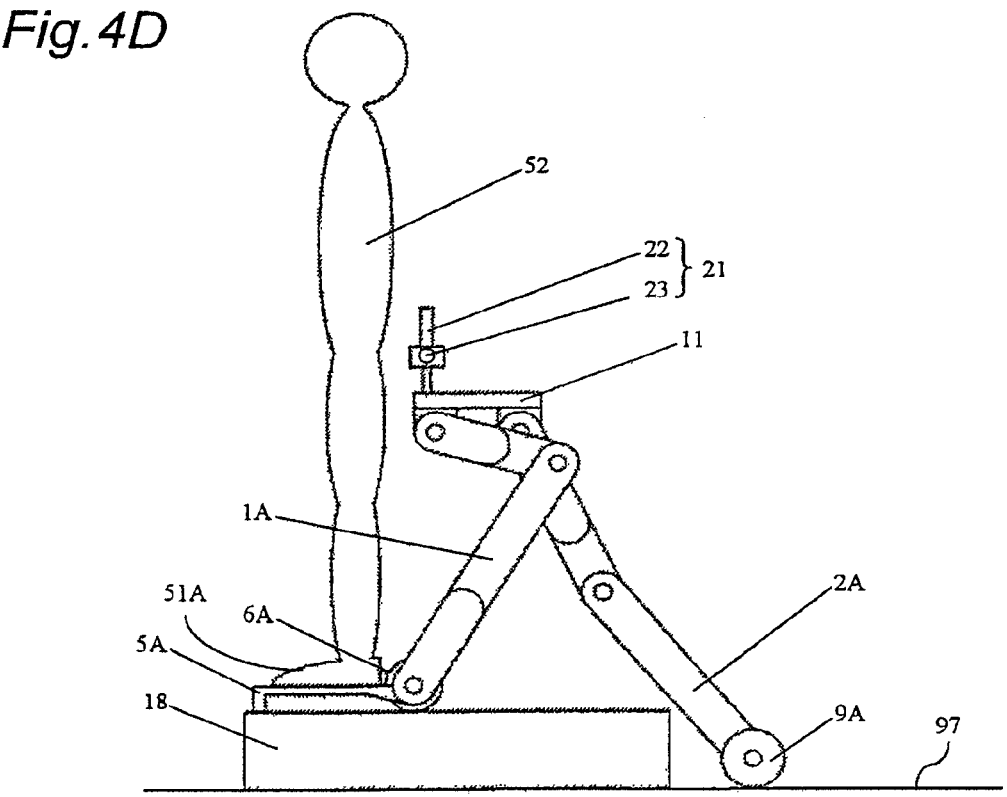
FIG. 4D is a side view that schematically shows step-difference ascending and descending operations of the leg-wheel traveling vehicle in accordance with the first embodiment of the present invention.

During a change from the walking mode on the step difference of FIG. 4C to the walking stop mode on the step difference of FIG. 4D, the right-foot portion 513 of the rider 52 is advanced by one step on the step 18 so as to be placed side by side the left-foot portion 51A of the rider 52. From the controlling point of view, the change is the same as the change from FIG. 4A to FIG. 4B so that the two link leg 2B is moved forward by the balance maintaining control. In the state shown in FIG. 4D, since the two link legs 1B and 2B are respectively placed on superimposed positions with the two link legs 1A and 1B, these are not shown in the figures.

Figure 4E:
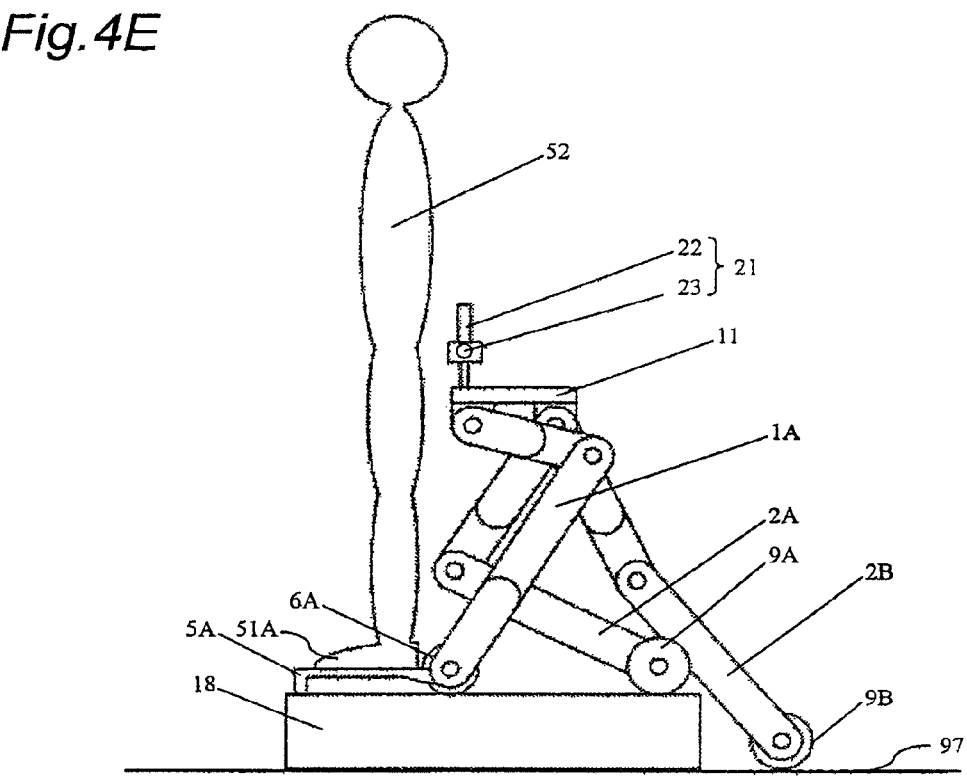
FIG. 4E is a side view that schematically shows step-difference ascending and descending operations of the leg-wheel traveling vehicle in accordance with the first embodiment of the present invention.
Figure 4F:
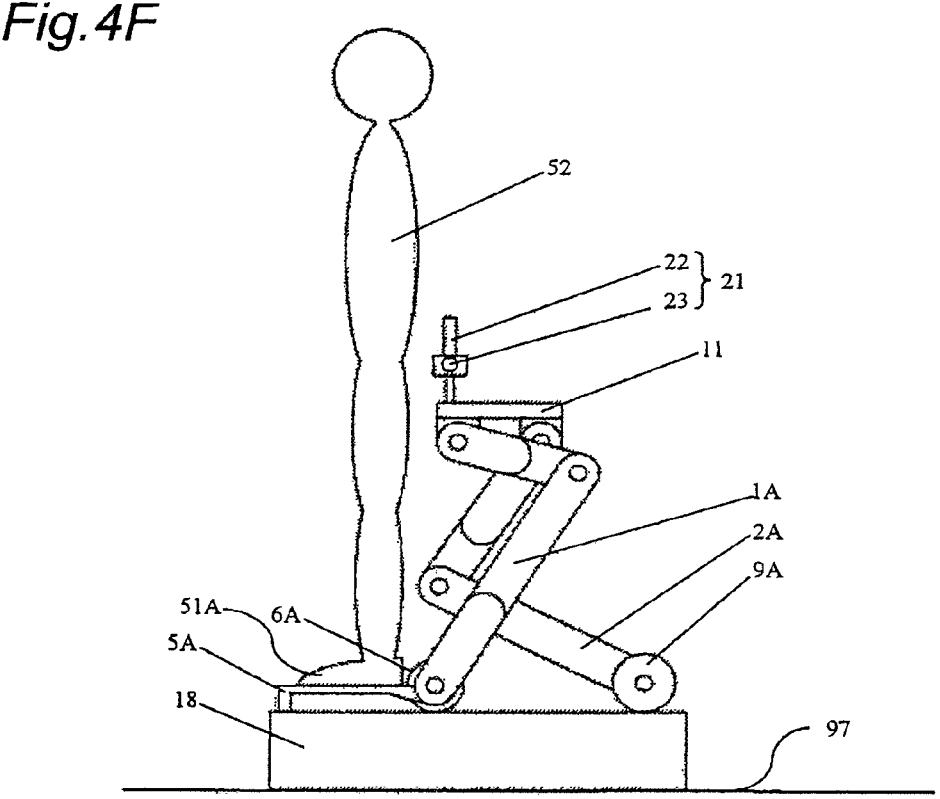
FIG. 4F is a side view that schematically shows step-difference ascending and descending operations of the leg-wheel traveling vehicle in accordance with the first embodiment of the present invention.

Here, at a stage where the process has reached a state shown in FIG. 4D, operations to be executed by the rider 52 are completed (step S38 in FIG. 9C), and the controlling computer 101 successively moves the two link legs 2A and 2B onto the step 18 so that states shown in FIGS. 4E and 4F (step S39 and step S40 in FIG. 9C) are attained.

With respect to the method for determining the completion of operations to be executed by the rider 52, that is, for determining the completion of the ascending and descending operations of the two link legs 1A and 1B, and for determining the timing in which the ascending and descending operations of the two link legs 2A and 2B to move the two link legs 2A and 2B onto the step 18 are started, a method in which the number of executions of the follow-up controlling operations after the step-difference ascending and descending mode has been effected is counted and stored in the storage device 102, and at a stage where the counted value has reached 3, the controlling computer 101 determines that the follow-up control of the third time corresponding to FIG. 4C to FIG. 4D has been completed, a method in which the determination is made at a stage where the controlling computer 101 has detected the fact that the foot-rest portions 5A and 5B are moved to side-by-side positions, with the two link legs 1A and 1B being made into the same shape, based upon the rotation angles of the respective rotation shafts 10A to 10J, or a method in which the determination is made when the rider 52 has given the corresponding information to the controlling computer 101 by operating the console 21, or the like may be used. In any of the methods, the two link legs 2A and 2B may be moved onto the step 18 immediately after the determination, or may be moved thereon after a predetermined lapse of time (for example, 3 seconds). Moreover, at a stage where the controlling computer 101 has determined that the movements of the rider 52 have been completed by referring to output variations of the landing sensors 17A, 17B, 17C, and 17D, the controlling computer 101 may operation-control the two link legs 2A and 2B so as to be moved onto the step 18. When the process proceeds to a state shown in FIG. 4F, the leg-wheel traveling vehicle is allowed to move onto the step 18.

Here, upon shifting to the state shown in FIG. 4F, a place where the rubber tire 9B of the two link leg 2B is landed corresponds to the place where, in FIG. 4B, the universal wheel 6B of the two link leg 1B has been landed. Since the two link legs 1A, 1B, 2A, and 2B are respectively connected to one another through the seat portion 11, the relative positions between the rubber tires 9A, 9B and the universal wheels 6A, 6B are easily calculated by the controlling computer 101. Therefore, based upon the relative positions between the universal wheel 6B and the rubber tire 9B in FIG. 4B, which can be calculated by the controlling computer 101 from the history of the rotation angles as one example of operation history recorded in the storage device 102, as well as based upon the amount of movements of the rubber tire 9B from FIG. 4B to FIG. 4D, the controlling computer 101 can calculate a relative distance required for the rubber tire 9B to move from the state shown in FIG. 4D to the position at which the universal wheel 6B has been landed in FIG. 4B. Thus, based upon the information of the relative distance, the controlling computer 101 can operate the two link leg 2B, while predicting the height or the like of the landing face of the step 18, so that it becomes possible to achieve high-speed operations.

Figure 4G:
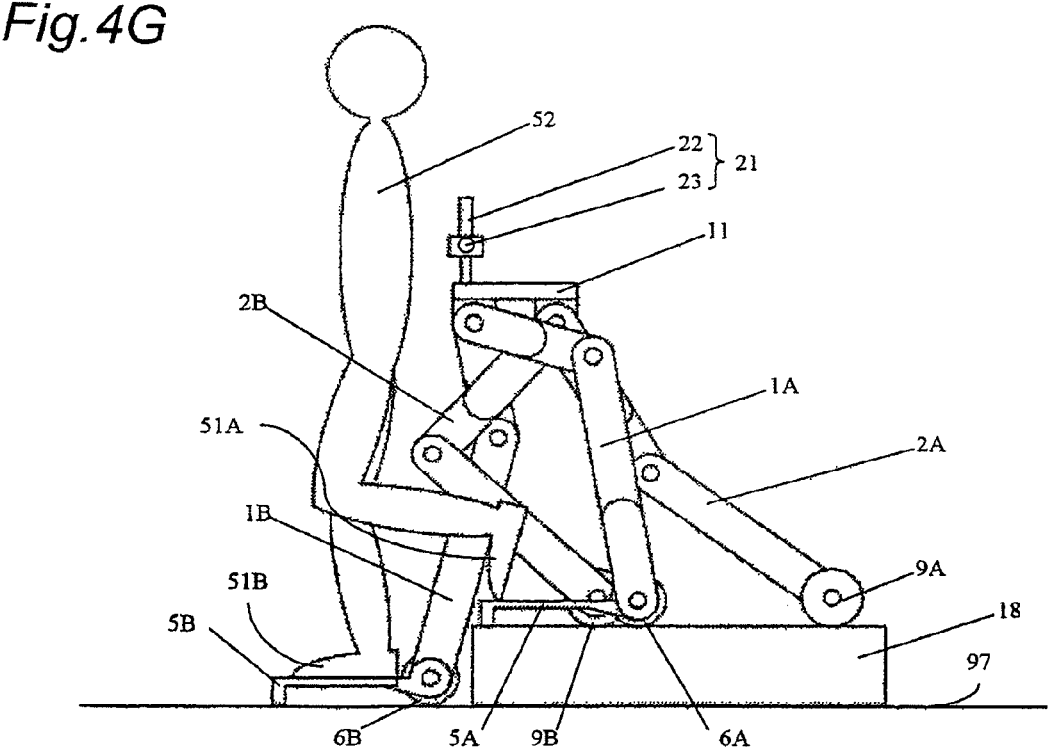
FIG. 4G is a side view that schematically shows step-difference ascending and descending operations of the leg-wheel traveling vehicle in accordance with the first embodiment of the present invention.
Figure 4H:
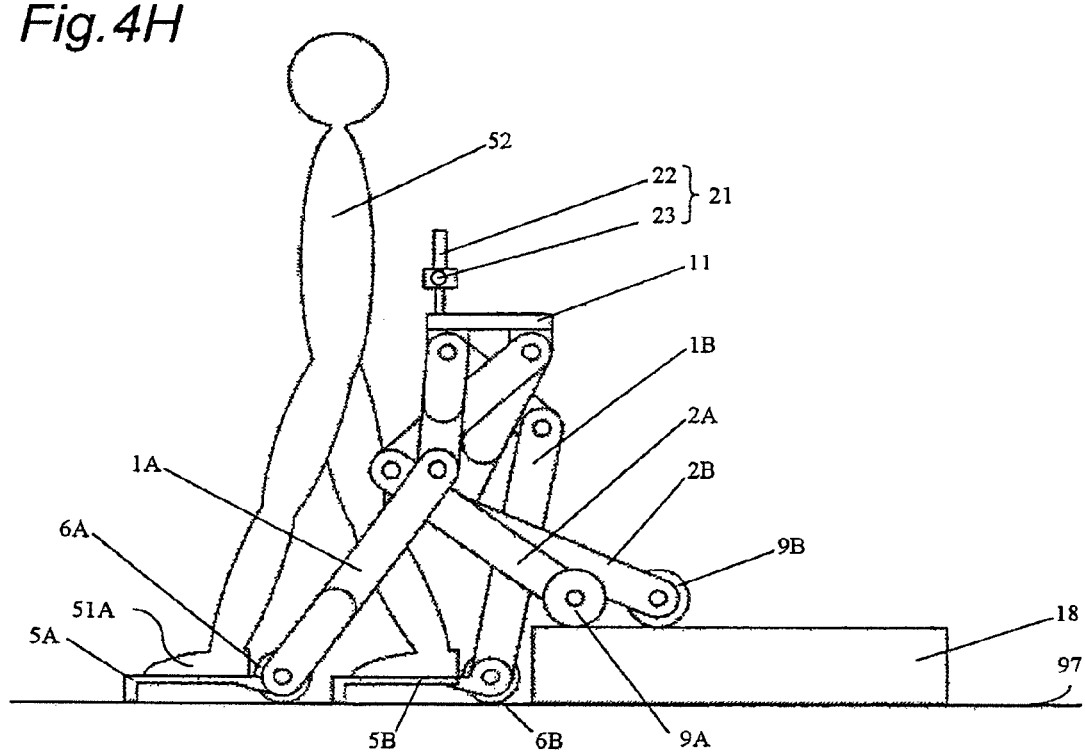
FIG. 4H is a side view that schematically shows step-difference ascending and descending operations of the leg-wheel traveling vehicle in accordance with the first embodiment of the present invention.
Figure 4I:
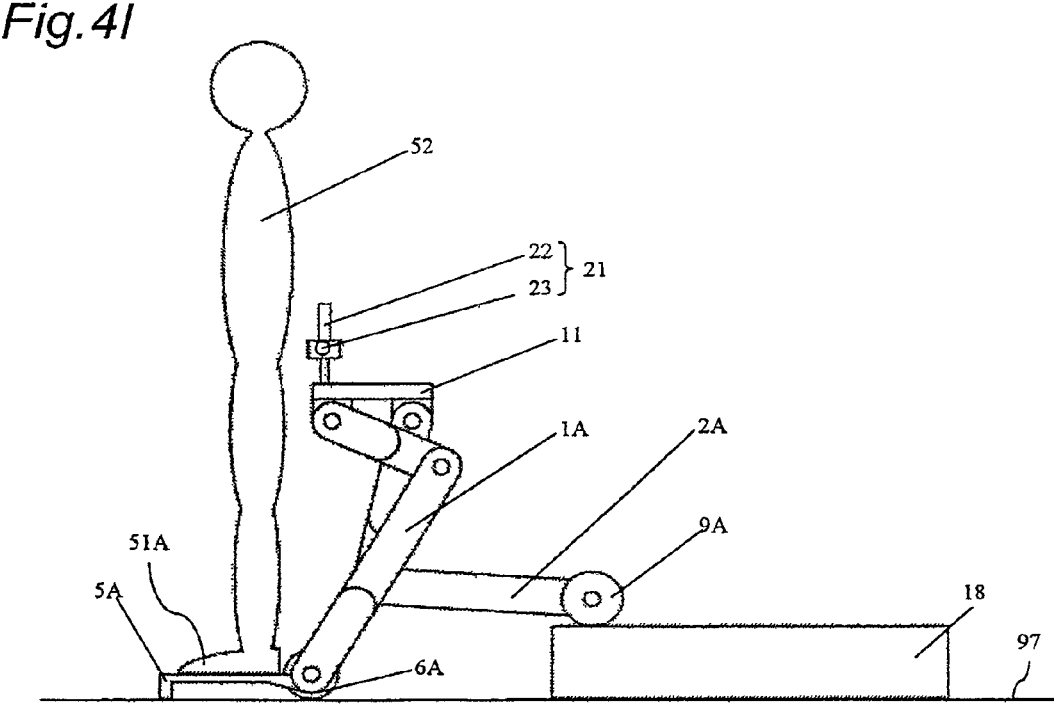
FIG. 4I is a side view that schematically shows step-difference ascending and descending operations of the leg-wheel traveling vehicle in accordance with the first embodiment of the present invention.
Figure 4J:
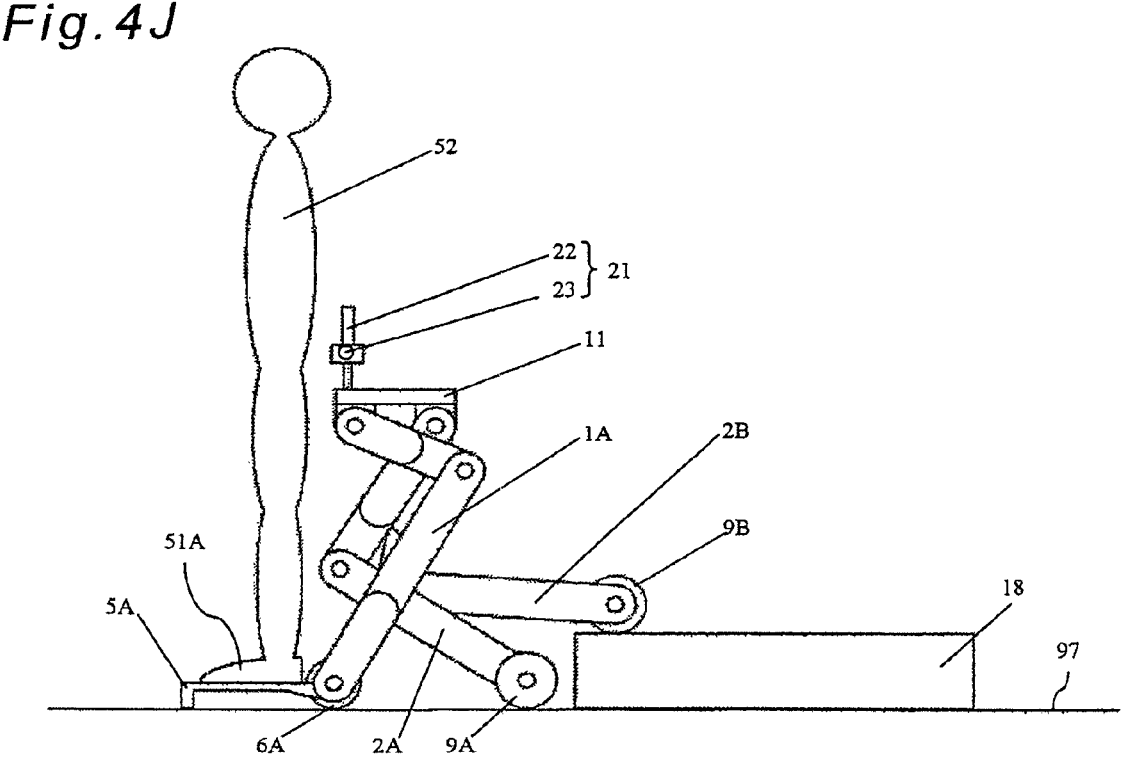
FIG. 4J is a side view that schematically shows step-difference ascending and descending operations of the leg-wheel traveling vehicle in accordance with the first embodiment of the present invention.
Figure 4K:
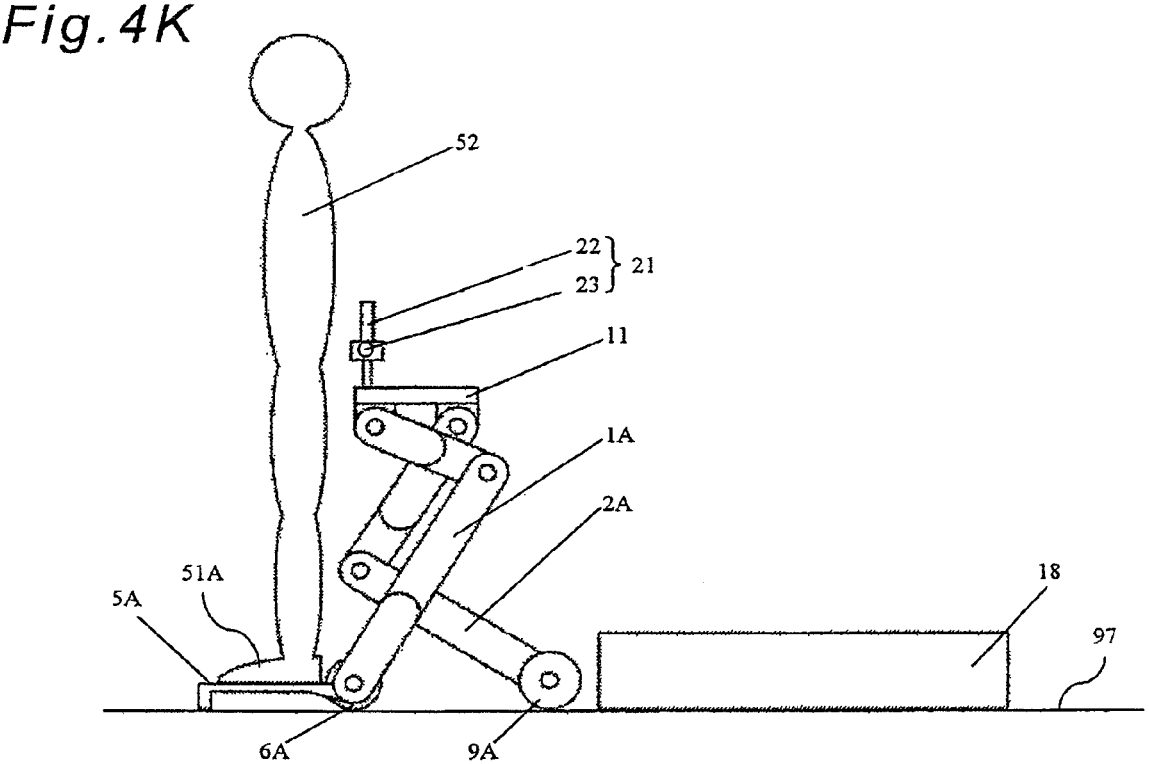
FIG. 4K is a side view that schematically shows step-difference ascending and descending operations of the leg-wheel traveling vehicle in accordance with the first embodiment of the present invention.

Next, upon going down from the step 18 onto the ground 97 or the like, by executing a cycle of FIGS. 4F to 4K, in the same manner as in the cycle of FIGS. 4A to 4F, the leg-wheel traveling vehicle is allowed to go down from the step 18 onto the ground 97 or the like. This cycle differs from that of FIGS. 4A to 4F only in that the movement is executed toward the higher side or toward the lower side, and as shown in a timing chart of FIG. 8, the transition of the controlling states is considered to be the same, as indicated by a timing chart shown in FIG. 8. Respectively, FIG. 4G shows a state in which the rider 52 lowers the right-foot portion 51B from the step 18, FIG. 4H shows a state in which the rider 52 next lowers the left-foot portion 51A from the step 18, FIG. 4I shows a state in which the rider 52 next allows the right-foot portion 51B to take one step forward, FIG. 4J shows a state in which the two link leg 2A goes down from the step 18 onto the ground 97 or the like, and FIG. 4K shows a state in which the two link leg 2B goes down from the step 18 onto the ground 97 or the like. Upon carrying out a plane-traveling process after completion of the step-difference ascending and descending operations, transforming processes are carried out up to a state shown in FIG. 2A, as shown by the lower end figure to the upper end figure of FIG. 6A, so that the process proceeds to the traveling mode.

In the above-mentioned embodiment, description has been given only to a case where the ascending operation onto the step 18 and the descending operation from the step 18 are continuously carried out; however, of course, from the state shown in FIG. 4 after going up to the step 18, the process may proceed to the traveling state, or from the traveling state, the process may proceeds to the going-down operation from the step 18, and any of those operations may be carried out. Moreover, the process of operations as shown in FIGS. 4A to 4K may be changed into a mode in which the order of the stepping-out feet of the rider 52 is reversed, or a mode in which the order of the ascending and descending controls of the two link legs 2A and 2B is reversed, and any of these can be executed in the same manner. Moreover, in the present embodiment, only two of the two link legs 2A and 2B corresponding to the support legs are used; however, by further increasing the number of the support legs, the stability of the leg-wheel traveling vehicle can be improved. Moreover, in a case where, upon follow-up controlling, an operation that is greatly different from conventional step-difference ascending and descending operations is requested in comparison with the angle history recorded in the storage device 102, the follow-up control may be stopped by defining this as an abnormal operation. For example, with respect to the amount of variation on the rotation angle of each of the rotation shafts per unit time and the amount of shift of each of the slide rods 14A and 14B, upper limit values may be preliminarily determined respectively, and in a case where the upper limit value is exceeded, the controlling computer 101 may determine this as abnormal so that the corresponding follow-up control may be stopped by the controlling computer 101. With this arrangement, the stability of the leg-wheel traveling vehicle against an abnormal operation of the rider 52 can be enhanced. Moreover, in the event of such a state, fixing bands 15A, 15B, 15C, and 15D may be released so that the foot portions 51A and SIB of the rider are made free from unnecessary restraint; thus, it becomes possible to enhance the safety of the rider 52.

Figure 5A:
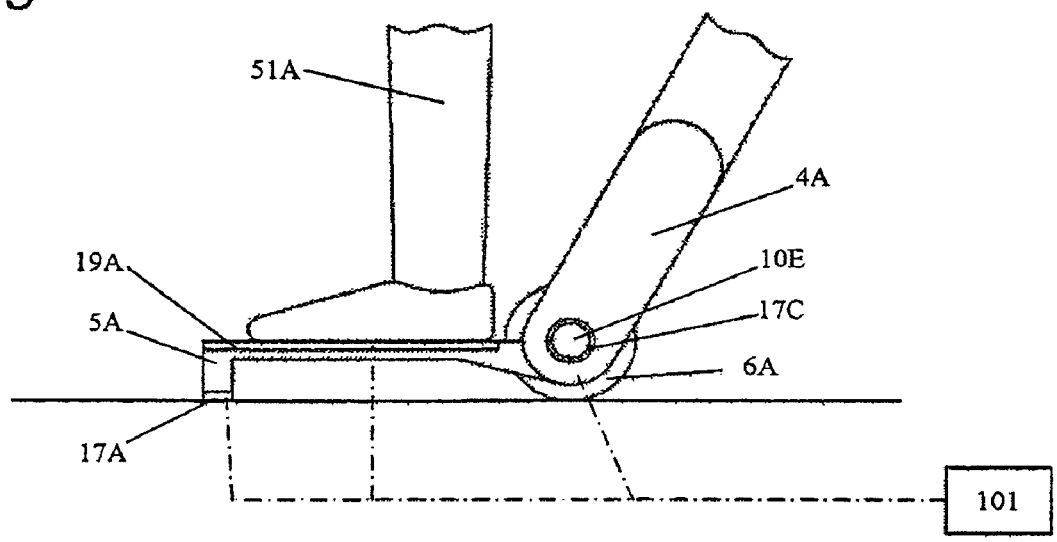
FIG. 5A is a side view that shows a detailed structure of the periphery of a foot rest portion 5A in accordance with another embodiment of the leg-wheel traveling vehicle.
Figure 5B:
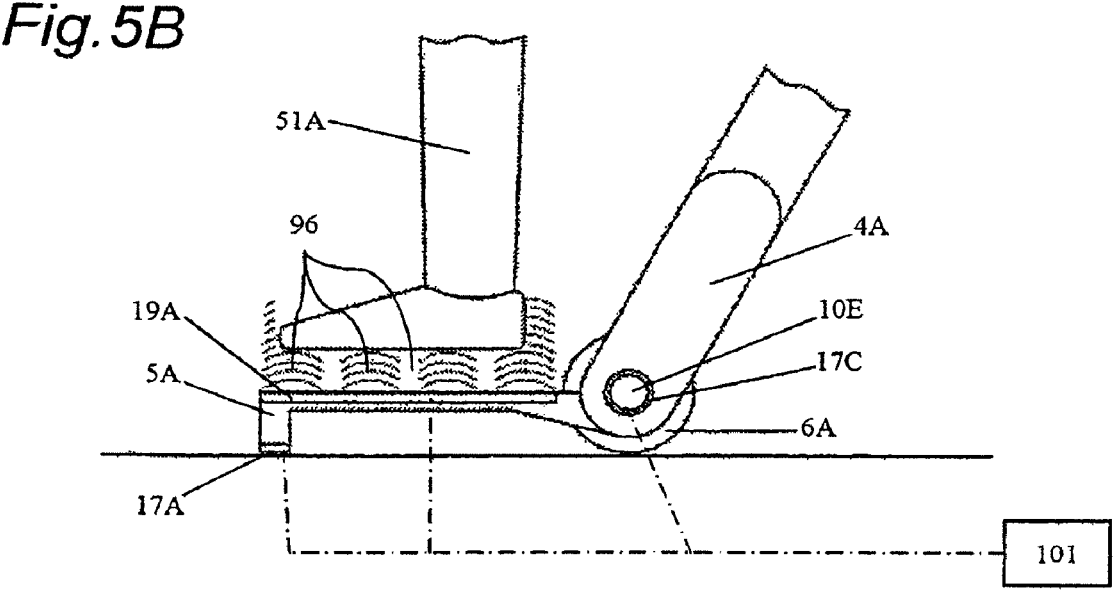
FIG. 5B is a side view that shows a detailed structure of the periphery of a foot rest portion 5B in accordance with still another embodiment of the leg-wheel traveling vehicle.

Moreover, FIG. 5A is a side view that shows the periphery of the foot-rest portion 5A in detail in another embodiment for measuring the relative positional change. Different from FIG. 3A, a distance sensor 19A of an ultrasonic system having an array pattern is placed on the foot-rest portion 5A, and as shown in FIG. 5B, ultrasonic waves 96 are discharged upward from the foot-rest portion 5A so that, by receiving the discharged ultrasonic waves 96 reflected by the foot portion 51 of the rider 52 and returned therefrom, the distance to the foot portion 51 of the rider 52 can be measured. Portions at which the discharged ultrasonic waves 96 are reflected by the foot portion 51 of the rider 52 are subjected to the distance measurement, while portions at which no discharged ultrasonic waves are reflected thereby are not subjected to the distance measurement; therefore, by detecting the border of these portions, it is possible to detect the position of the foot portion 51A of the rider 52 in the horizontal direction. To measure the relative positional change by using this system is desirable from the viewpoint that the relative positional change can be measured without restricting the foot portion 51A of the rider 52. Here, not limited to the ultrasonic system, any system, such as a distance sensor using an optical system like a laser, may be adopted as the distance sensor, as long as it can achieve the same function.

As described above, in accordance with the present embodiments, by using information about the relative positional change between the foot portions 51A, 51B of the rider 52 and the foot-rest portions 5A and 5B, the foot-rest portions 5A and 5B, attached to the tips of the two link legs 1A and 1B that serve one example of the follow-up legs, are allowed to follow up the foot portions 51A and 51B of the rider 52, so that, in cooperation with the movements of the foot portions 51A and 51B of the rider 52 himself or herself that have been determined by the rider 52 based upon his or her recognition on the state of a step difference, the legs of the leg-wheel traveling vehicle are operated; therefore, it is possible to quickly carry out the recognition of the step difference state and the operations of the two link legs of the leg-wheel traveling vehicle. Moreover, at the time of the step-difference ascending and descending operations, the position of the rider 52 is kept virtually in the same level as the height in a normal walking state, although it becomes higher by a length corresponding to the height of the foot rest portion 5A; thus, since this arrangement eliminates the necessity of having to sitting on the upper portion of the leg mechanism, it is possible to prevent risk of falling down from a high place even in the event of a fall down of the leg-wheel traveling vehicle. Moreover, in a case of the arrangement shown in FIG. 5A, different from the arrangement in FIG. 3A, since the foot portions 51A and 51B of the rider 52 are made completely free from restrictions onto the foot-rest portions 5A and 5B by the fixing bands 15A and 15B, it is possible to easily escape from the leg-wheel traveling vehicle, when the leg-wheel traveling vehicle becomes unstable, and consequently to further ensure the safety. Therefore, it is possible to provide a leg-wheel traveling vehicle of a leg-wheel type, which can quickly carry out step-difference ascending and descending operations, while ensuring the safety of the rider 52.

Here, the present invention is not intended to be limited by the above-mentioned embodiments, and can be carried out in various other modes.

For example, in the present embodiments, two link legs, which are provided with intermediate rocking joints, are used as follow-up legs (for example, two link legs 1A, 1B) and support legs (for example, two link legs 2A, 2B) that can freely flexibly expand the distances between the end portions serving as upper end portions that are freely rotatably coupled to support portions 11a, 11b, 11c, and 11d of the seat portion 11 and the tip portions serving as lower end portions on which the universal wheels 6A, 6B or the rubber tires 9A, 9B are rotatably supported; however, the leg structure is not intended to be limited by these two link legs, and any combination of conventional techniques, such as legs having a structure with a directly-driven sliding mechanism, may be used, as long as the same function is achieved. Moreover, although the present embodiments use the universal wheels 6A and 6B as the driven wheels, any of structures, such as various kinds of composite-type omnidirectional wheels in which small-diameter rollers are combined with the periphery of a hub, spherical shaped wheels and casters, may also be utilized, as long as the same function is achieved. Moreover, a structure in which a driving wheel is used on the follow-up leg side, with a driven wheel being used on the support leg side, or a structure in which all the wheels are provided as driving wheels may be used. In addition, an endless track that achieves the same function as a wheel may be used.

Furthermore, in the embodiments as shown in FIGS. 3A, 3B, and 3C, flexible slide rods 14A and 14B are used as one example of a flexible coupling mechanism; however, not limited to this structure, any combinations of prior-art techniques, such as mechanisms utilizing a link mechanism or distortion of an elastic member, may be used as long as the same function can be achieved.

By properly combining the arbitrary embodiments of the aforementioned various embodiments, the effects possessed by the embodiments can be produced.

INDUSTRIAL APPLICABILITY

The leg-wheeled traveling mechanism of the present invention makes it possible to carry out step-difference ascending and descending operations quickly, while ensuring the safety of a rider, and is effectively used as a passenger traveling vehicle.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A leg-wheeled traveling mechanism comprising:
   a seat portion;
   two follow-up legs, each having a follow-up leg end portion that is freely rotatably connected to the seat portion, and having a first wheel portion and a foot-rest portion at a follow-up leg tip portion, with a distance between the follow-up leg end portion and the follow-up leg tip portion being retractable;
   two or more support legs, each having a support-leg end portion that is freely rotatably connected to the seat portion, and having a second wheel portion at a support-leg tip portion, with a distance between the support-leg end portion and a support-leg tip portion being retractable; and
   a control device for controlling operations of the follow-up legs and the support legs,
   wherein the leg-wheeled traveling mechanism further comprises a foot-position measuring unit for measuring relative positional changes of the two foot-rest portions and foot portions of a rider so that the control device operates the follow-up legs based upon the relative positional changes measured by the foot-position measuring unit so as to allow the foot-rest portions to move virtually in the same directions as those of the foot portions of the rider.

2. The leg-wheeled traveling mechanism according to claim 1, wherein the foot-position measuring unit is formed by a relative-position measuring unit for measuring an amount of change and a direction of change of a flexibly expandable coupling mechanism that couples the foot portions of the rider to the foot-rest portions.

3. The leg-wheeled traveling mechanism according to claim 1, wherein the foot-position measuring unit is a device for measuring the relative positional changes in a non-contact state by using sound waves or light waves.

4. The leg-wheeled traveling mechanism according to claim 1, wherein the first wheel portions attached to the follow-up legs are driven wheels, while the second wheel portions attached to the support legs are driving wheels.

5. The leg-wheeled traveling mechanism according to claim 1, wherein the control device controls transformed states of the follow-up legs so that the relative positional changes between the foot-rest portions and the foot portions of the rider are set within a predetermined range.

6. The leg-wheeled traveling mechanism according to claim 1, wherein the control device divides each of the relative positional changes between the foot-rest portions and the foot portions of the rider into a horizontal component and a vertical component so that a transformed state of the follow-up leg is controlled so as to maintain each of the components within a predetermined range.

7. The leg-wheeled traveling mechanism according to claim 5, further comprising:
a landing determination device for respectively determining landed states of the two foot-rest portions,
wherein, from a time when the foot-rest portions have come into the landed state, the control device controls transformed states of the follow-up legs provided with the foot-rest portions independent of the relative positional changes measured by the foot-position measuring unit, and thereafter, from a time when each of the relative positional changes has reached a predetermined value or more, again controls transformed states of the follow-up legs so that the relative positional changes between the foot-rest portions and the foot portions of the rider are set within a predetermined range.

8. The leg-wheeled traveling mechanism according to claim 6, further comprising:
a landing determination device for respectively determining landed states of the two foot-rest portions,
wherein, from a time when the foot-rest portions have come into the landed state, the control device controls transformed states of the follow-up legs provided with the foot-rest portions independent of the relative positional changes measured by the foot-position measuring unit, and thereafter, from a time when each of the relative positional changes has reached a predetermined value or more, again controls transformed states of the follow-up legs so that the relative positional changes between the foot-rest portions and the foot portions of the rider are set within a predetermined range.

9. The leg-wheeled traveling mechanism according to claim 7, wherein the predetermined value is greater than a maximum value of the relative positional changes within the predetermined range.

10. The leg-wheeled traveling mechanism according to claim 8, wherein the predetermined value is greater than a maximum value of the relative positional changes within the predetermined range.

11. The leg-wheeled traveling mechanism according to claim 1, further comprising:
a riding state determining device for detecting a riding state of the rider so that, in a case where under the riding state, the first wheel portion or the second wheel portion is rotating, the control device controls the transformed states of the follow-up legs and the support legs, independent of the relative positional changes measured by the foot-position measuring unit.

12. The leg-wheeled traveling mechanism according to claim 11, wherein the riding state determining device determines the riding state based upon a load applied to a seat face of the seat portion.

13. The leg-wheeled traveling mechanism according to claim 1, wherein the control device operates the follow-up legs and the support legs so that the seat portion is made virtually horizontal to a ground under the traveling state, and in a mid time from the traveling state to a shift to an operative state of the follow-up legs based upon relative positional changes measured by the foot-position measuring unit, the control device operates the follow-up legs and the support legs so that the seat portion is made virtually perpendicular to the ground.

14. The leg-wheeled traveling mechanism according to claim 13, wherein, upon operating the follow-up legs and the support legs so as to shift a seat face of the seat portion from a state virtually in parallel with a ground to a virtually perpendicular state, the control device controls each of the foot-rest portions so that an angle of each of the foot-rest portions is always kept horizontal, or kept in such a manner that a tip side thereof is made higher.

15. The leg-wheeled traveling mechanism according to claim 1, wherein, upon allowing each of the follow-up legs to leave from a ground, the control device controls transformed states of the support legs so that balance of the leg-wheeled traveling mechanism is properly maintained.

16. The leg-wheeled traveling mechanism according to claim 1, wherein the control device controls the support legs by using operation history of the follow-up legs.

* * * * *